(12) United States Patent
Kozicz et al.

(10) Patent No.: US 10,995,891 B2
(45) Date of Patent: May 4, 2021

(54) CONNECTOR ASSEMBLIES FOR CONNECTING TUBULARS AND RELATED METHODS

(71) Applicant: TRANSOCEAN SEDCO FOREX VENTURES LIMITED, Grand Cayman (KY)

(72) Inventors: John Kozicz, Spring, TX (US); Craig McCormick, Waller, TX (US)

(73) Assignee: Transocean Sedco Forex Ventures Limited, Grand Cayman (KY)

( * ) Notice: Subject to any disclaimer, the term of this patent is extended or adjusted under 35 U.S.C. 154(b) by 369 days.

(21) Appl. No.: 15/784,129

(22) Filed: Oct. 14, 2017

(65) Prior Publication Data

US 2018/0128406 A1 May 10, 2018

Related U.S. Application Data

(60) Provisional application No. 62/408,527, filed on Oct. 14, 2016.

(51) Int. Cl.
*F16L 37/252* (2006.01)
(52) U.S. Cl.
CPC ................... *F16L 37/252* (2013.01)
(58) Field of Classification Search
CPC .............. F16L 37/252; F16L 15/06
USPC ....................................... 285/391
See application file for complete search history.

(56) References Cited

U.S. PATENT DOCUMENTS

| 959,226 | A | * | 5/1910 | Keys | F16L 37/252 |
| | | | | | 285/87 |
| 995,966 | A | * | 6/1911 | Hill | F16L 37/252 |
| | | | | | 285/85 |
| 1,039,536 | A | * | 9/1912 | Hill | F16L 37/252 |
| | | | | | 285/86 |
| 1,113,556 | A | * | 10/1914 | Hill | F16L 37/252 |
| | | | | | 285/86 |
| 1,311,145 | A | * | 7/1919 | Zeindler | F16L 37/252 |
| | | | | | 285/27 |
| 1,507,877 | A | * | 9/1924 | Wilson | E21B 17/042 |
| | | | | | 285/391 |

(Continued)

OTHER PUBLICATIONS

International Search Report and Written Opinion issued by the International Searching Authority for Application No. PCT/US2017/056694, dated Jan. 29, 2018, 9 pages.

*Primary Examiner* — David Bochna

(57) ABSTRACT

Some connector assemblies include a female connector having a sidewall extending between first and second ends to define an interior channel, the sidewall having a cylindrical inner surface, and a plurality of lugs extending from and disposed circumferentially along the inner surface, and a male connector having a sidewall extending between first and second ends to define an interior channel, the sidewall having a cylindrical outer surface, and a plurality of lugs extending from and disposed circumferentially along the outer surface, wherein the male connector is configured to be coupled to the female connector such that the sidewall of the male connector is received through the first end of and into the interior channel of the female connector, and at least one of the lugs of the male connector is disposed between at least one of the lugs of the female connector and the second end of the female connector.

39 Claims, 15 Drawing Sheets

(56) References Cited

U.S. PATENT DOCUMENTS

| | | | | |
|---|---|---|---|---|
| 1,539,287 A | * | 5/1925 | Wilson | E21B 17/042 |
| | | | | 285/333 |
| 1,645,032 A | * | 10/1927 | Wilson | E21B 17/042 |
| | | | | 285/27 |
| 1,671,458 A | * | 5/1928 | Wilson | E21B 17/046 |
| | | | | 403/343 |
| 3,061,336 A | * | 10/1962 | Waggener | E21B 17/06 |
| | | | | 285/84 |
| 4,330,140 A | * | 5/1982 | Hampton | E21B 33/038 |
| | | | | 285/310 |
| 5,403,043 A | * | 4/1995 | Smet | F16L 37/2445 |
| | | | | 285/148.21 |
| 6,283,511 B1 | * | 9/2001 | Kamp | F16L 37/2445 |
| | | | | 285/334.4 |
| 7,380,590 B2 | * | 6/2008 | Hughes | E21B 33/085 |
| | | | | 166/84.3 |
| 2004/0207202 A1 | * | 10/2004 | Parks | F16L 37/105 |
| | | | | 285/391 |
| 2005/0087985 A1 | * | 4/2005 | Mosing | F16L 37/2445 |
| | | | | 285/391 |
| 2007/0057508 A1 | * | 3/2007 | MacAulay | E21B 17/042 |
| | | | | 285/391 |
| 2011/0147009 A1 | * | 6/2011 | Dupal | E21B 17/043 |
| | | | | 166/380 |
| 2012/0325335 A1 | | 12/2012 | Schalkx et al. | |
| 2018/0128406 A1 | | 5/2018 | Kozicz | |

* cited by examiner

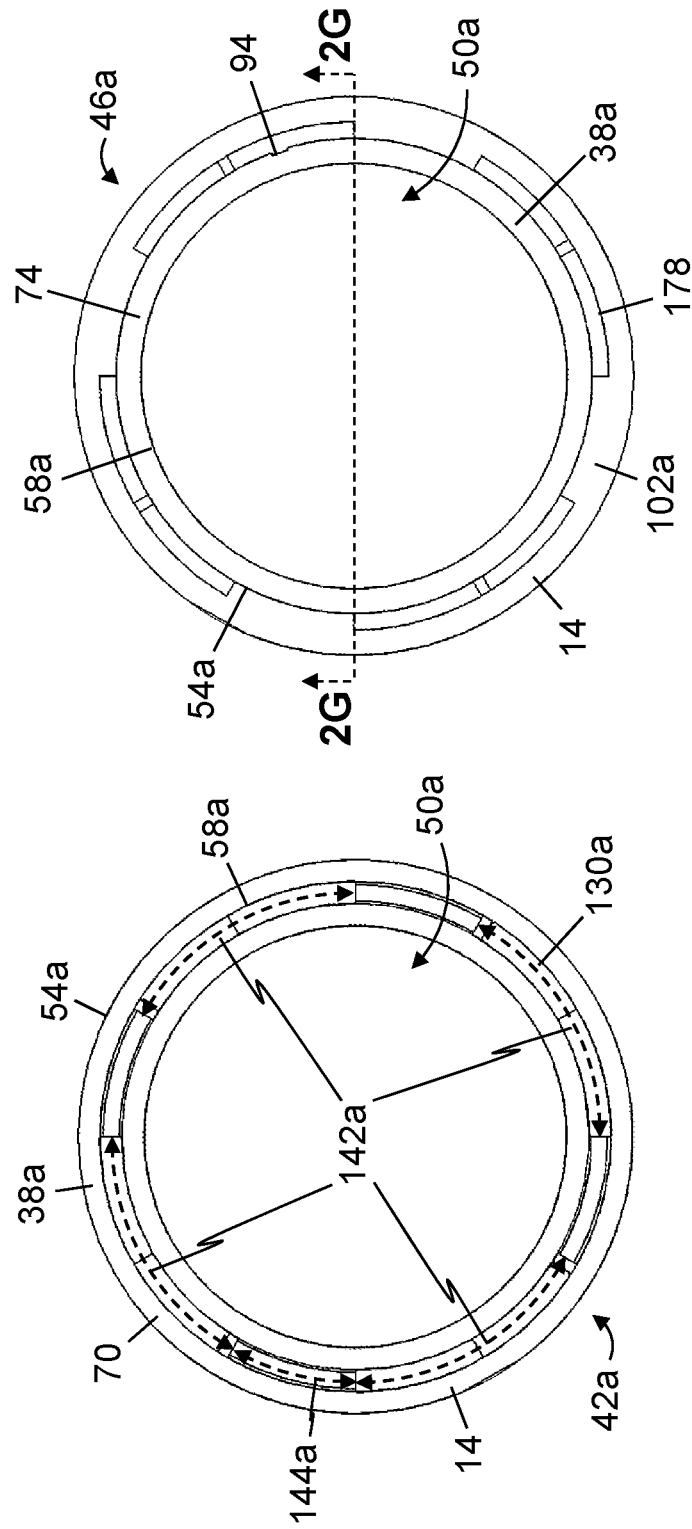

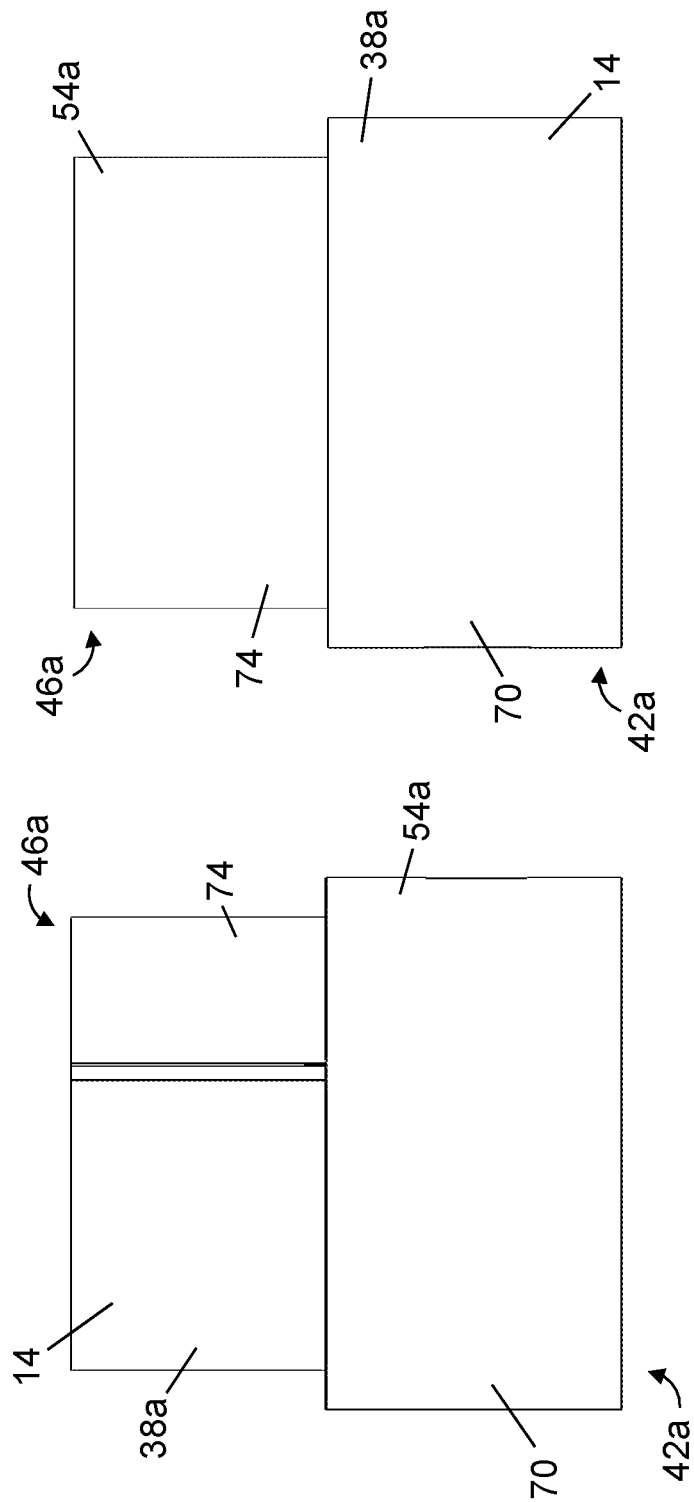

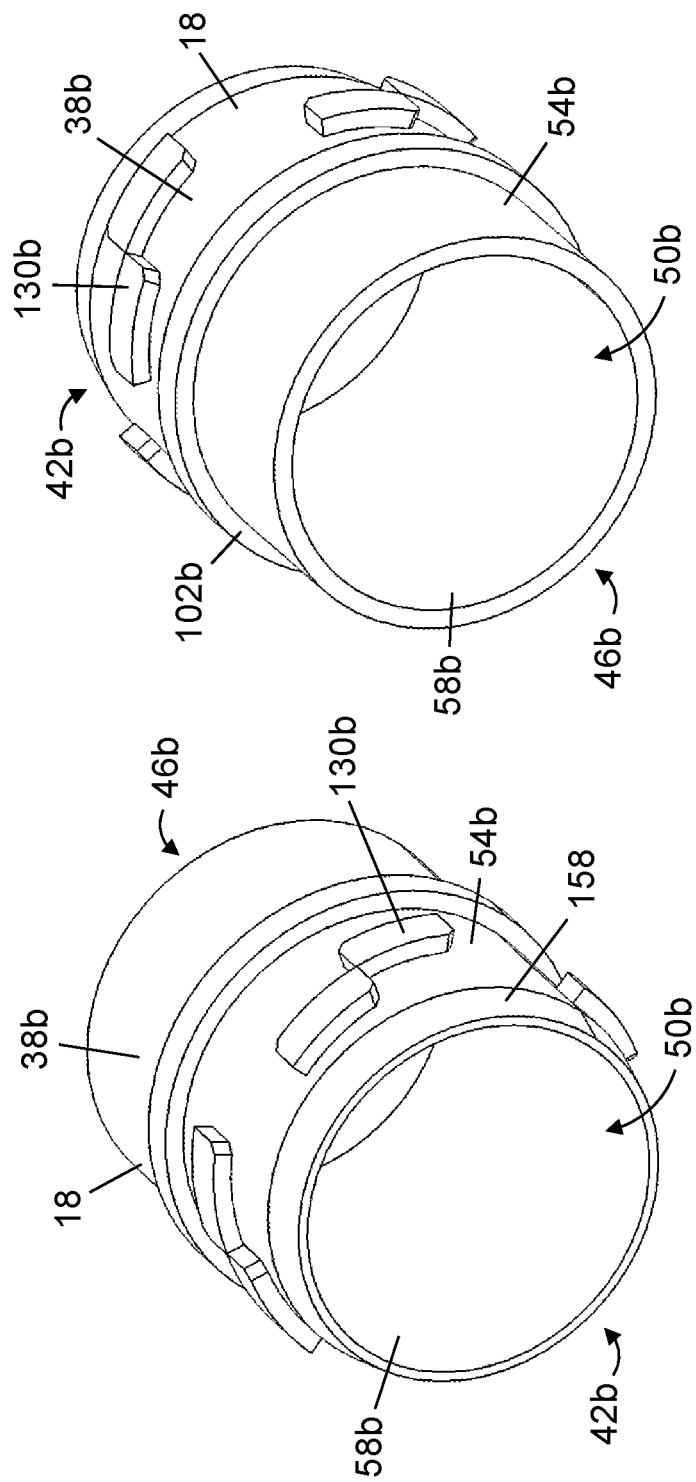

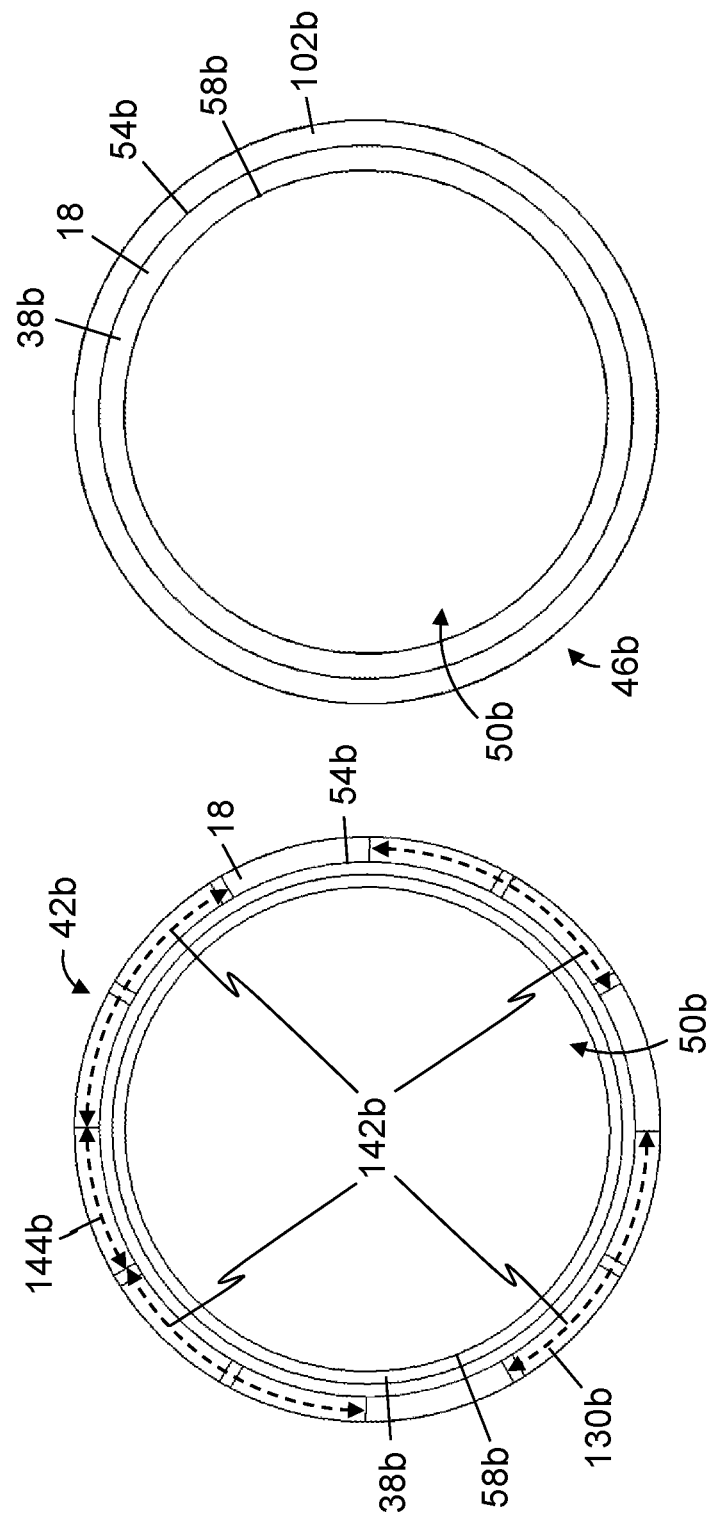

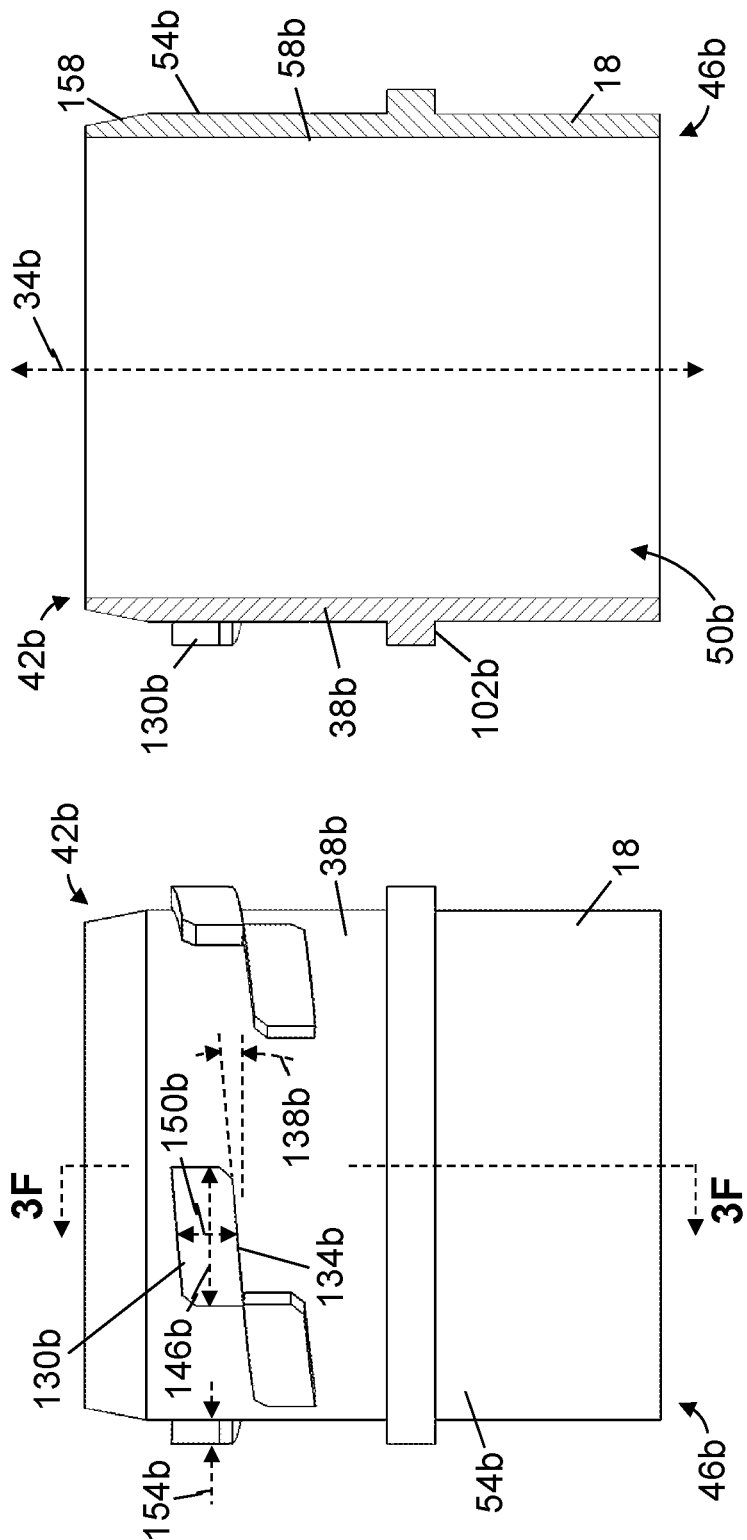

CONNECTOR ASSEMBLIES FOR CONNECTING TUBULARS AND RELATED METHODS

CROSS-REFERENCE TO RELATED APPLICATION

This application claims priority to U.S. Provisional Patent Application No. 62/408,527, filed Oct. 14, 2016, which is incorporated herein by reference in its entirety.

BACKGROUND

1. Field of Invention

The present invention relates generally to connector assemblies for connecting tubulars (e.g., tubes, pipes, lines, conduits, hoses, and/or the like), and more specifically, but not by way of limitation, to connector assemblies for connecting oil and/or gas well-related tubulars, such as, for example, risers, pipes (e.g., drill, casing, pipeline, and/or the like pipes), lines (e.g., choke, kill, and/or the like lines), and/or the like, to other oil and/or gas well-related tubulars and/or to oil and/or gas well-related structures.

2. Description of Related Art

Tubular connectors, which are used in a variety of industries, allow for the connection of tubulars to other tubulars and/or to structures. As one example, in the oil and gas industry, tubular connectors are often used to connect sections of a tubular (e.g., a riser, drill pipe, and/or the like) when lowering the tubular toward a well.

Some tubular connectors, such as traditional drill pipe connectors and casing connectors, are threaded. To connect a tubular to such a threaded connector, a thread of the connector is engaged with a corresponding thread of the tubular, and the tubular is rotated relative to the connector. Connecting tubulars using such threaded connectors may be problematic and/or time consuming, as such a threaded connector may be unforgiving of misalignment between a tubular and the connector, require multiple rotations of the tubular relative to the connector, and/or the like.

Some tubular connectors, such as traditional riser connectors, include flanges through which fasteners (e.g., bolts) can be disposed in order to connect tubulars to other tubulars and/or to structures. In addition to such flange-based connectors being unforgiving of tubular/connector misalignment, connecting tubulars using such flange-based connectors may—at least by involving the use of separate fasteners—be undesirably complex and/or time consuming.

SUMMARY

Some embodiments of the present connector assemblies for connecting a first tubular to a second tubular comprise: a female connector having a sidewall extending between a first end and a second end to define an interior channel, the sidewall having a cylindrical inner surface, the second end configured to be coupled to the first tubular, and a plurality of lugs extending from and disposed circumferentially along the inner surface, and a male connector having a sidewall extending between a first end and a second end to define an interior channel, the sidewall having a cylindrical outer surface, the second end configured to be coupled to the second tubular, and a plurality of lugs extending from and disposed circumferentially along the outer surface, wherein the male connector is configured to be coupled to the female connector such that the sidewall of the male connector is at least partially received within the interior channel of the female connector, and at least one of the lugs of the male connector is disposed between at least one of the lugs of the female connector and the second end of the female connector and in contact with the at least one lug of the female connector.

In some connector assemblies, the male connector is configured to be coupled to the female connector such that each of the lugs of the male connector is disposed between at least one of the lugs of the female connector and the second end of the female connector and in contact with the at least one lug of the female connector. In some connector assemblies, the male connector is configured to be coupled to the female connector such that each of the lugs of the female connector is disposed between at least one of the lugs of the male connector and the second end of the male connector and in contact with the at least one lug of the male connector.

In some connector assemblies, the male connector is configured to be coupled to the female connector at least by inserting the first end of the male connector through the first end of the female connector and into the interior channel of the female connector such that at least one of the lugs of the male connector extends longitudinally beyond at least one of the lugs of the female connector, and rotating the male connector relative to the female connector such that the at least one lug of the male connector is disposed between the at least one lug of the female connector and the second end of the female connector and in contact with the at least one lug of the female connector.

In some connector assemblies, for the female connector, the lugs extend along the inner surface of the sidewall a collective circumferential distance that is approximately 75% of a circumference of the inner surface. In some connector assemblies, for the male connector, the lugs extend along the outer surface of the sidewall a collective circumferential distance that is approximately 75% of a circumference of the outer surface. In some connector assemblies, circumferentially adjacent ones of the lugs of at least one of the female connector and the male connector are longitudinally offset relative to one another.

In some connector assemblies, for at least one of the female connector and the male connector, a thickness of at least one of the lugs decreases along the lug in a direction from the second end and toward the first end. In some connector assemblies, at least one of the lugs of the female connector has a width, measured along a circumference of the inner surface, and a length, measured in a direction aligned with a longitudinal axis of the female connector, that is smaller than the width. In some connector assemblies, at least one of the lugs of the male connector has a width, measured along a circumference of the outer surface, and a length, measured in a direction aligned with a longitudinal axis of the male connector, that is smaller than the width.

In some connector assemblies, at least one of the lugs of the female connector includes a mating surface configured to contact at least one of the lugs of the male connector when the male connector is coupled to the female connector, and the mating surface is angularly disposed at a non-perpendicular angle relative to a plane that is perpendicular to a longitudinal axis of the female connector. In some connector assemblies, at least one of the lugs of the male connector includes a mating surface configured to contact at least one of the lugs of the female connector when the male connector is coupled to the female connector, and the mating surface is angularly disposed at a non-perpendicular angle relative to a plane that is perpendicular to a longitudinal axis of the male connector.

In some connector assemblies, the sidewall of the female connector tapers in thickness at the first end. In some connector assemblies, the sidewall of the male connector tapers in thickness at the first end. In some connector assemblies, the female connector includes a ramp extending from the inner surface of the sidewall, the ramp configured to contact the first end of the male connector when the male connector is coupled to the female connector.

Some connector assemblies comprise a locking member having one or more tabs, wherein the locking member is configured to be coupled to the female connector or the male connector such that, when the male connector is coupled to the female connector, each of the one or more tabs contacts at least one of the lugs of the female connector and/or at least one of the lugs of the male connector. In some connector assemblies, the female connector or the male connector defines one or more openings configured to receive the one or more tabs of the locking member.

In some connector assemblies, the female connector is coupled to the first tubular and/or the male connector is coupled to the second tubular. In some connector assemblies, the first tubular and the second tubular each comprise a riser or a drill pipe.

Some embodiments of the present methods for connecting a first tubular to a second tubular comprise coupling a male connector to a female connector, wherein the female connector comprises a sidewall extending between a first end and a second end to define an interior channel, the sidewall having a cylindrical inner surface, the second end coupled to a first tubular, and a plurality of first lugs extending from and disposed circumferentially along the inner surface, wherein the male connector comprises a sidewall extending between a first end and a second end to define an interior channel, the sidewall having a cylindrical outer surface, the second end coupled to a first tubular, and a plurality of first lugs extending from and disposed circumferentially along the outer surface, and wherein the coupling the male connector to the female connector comprises inserting the first end of the male connector through the first end of the female connector and at least partially into the interior channel of the female connector such that at least one of the first lugs of the male connector extends longitudinally beyond at least one of the first lugs of the female connector, and rotating the male connector relative to the female connector such that the at least one first lug of the male connector is disposed between the at least one first lug of the female connector and the second end of the female connector and in contact with the at least one first lug of the female connector.

In some methods, the male connector comprises a plurality of second lugs extending from and disposed circumferentially along the outer surface, the second lugs being circumferentially and longitudinally offset relative to the first lugs of the male connector, and the coupling the male connector to the female connector comprises further inserting the male connector into the female connector such that at least one of the second lugs of the male connector extends longitudinally beyond at least one of the first lugs of the female connector, and further rotating the male connector relative to the female connector such that the at least one second lug of the male connector is disposed between the at least one first lug of the female connector and the second end of the female connector and in contact with the at least one first lug of the female connector. In some methods, the female connector comprises a plurality of second lugs extending from and disposed circumferentially along the inner surface, the second lugs being circumferentially and longitudinally offset relative to the first lugs of the female connector, the further inserting is performed such that at least one of the first lugs of the male connector extends longitudinally beyond at least one of the second lugs of the female connector, and the further rotating is performed such that the at least one first lug of the male connector is disposed between the at least one second lug of the female connector and the second end of the female connector and in contact with the at least on second lug of the female connector.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially" and "approximately" may be substituted with "within [a percentage] of" what is specified, where the percentage includes 0.1, 1, 5, and 10 percent.

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any embodiment of any of the apparatuses, systems, and methods can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments are described above, and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

FIGS. 2C and 2D are front and back views, respectively, of the female connector of FIGS. 2A and 2B.

FIGS. 2E and 2F are opposing side views of the female connector of FIGS. 2A and 2B.

FIGS. 3A and 3B are perspective views of a male connector of the connector assembly of FIG. 1.

FIGS. 3C and 3D are front and back views, respectively, of the male connector of FIGS. 3A and 3B.

FIG. 3E is a side view of the male connector of FIGS. 3A and 3B.

FIG. 3F is a cross-sectional side view of the male connector of FIGS. 3A and 3B, taken along line 3F-3F of FIG. 3E.

DETAILED DESCRIPTION

Figure 1:
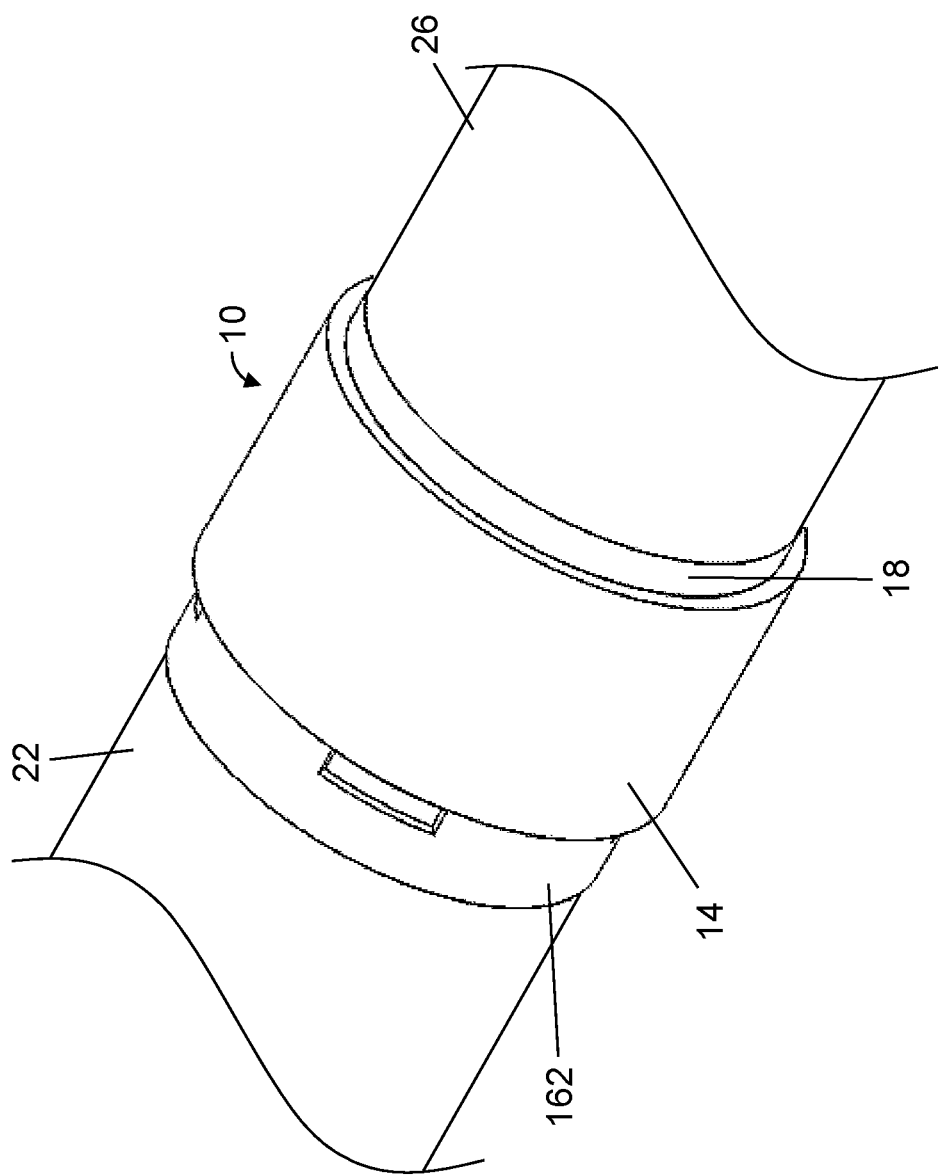
FIG. 1 is a perspective view of one embodiment of the present connector assemblies.
Figure 2B:
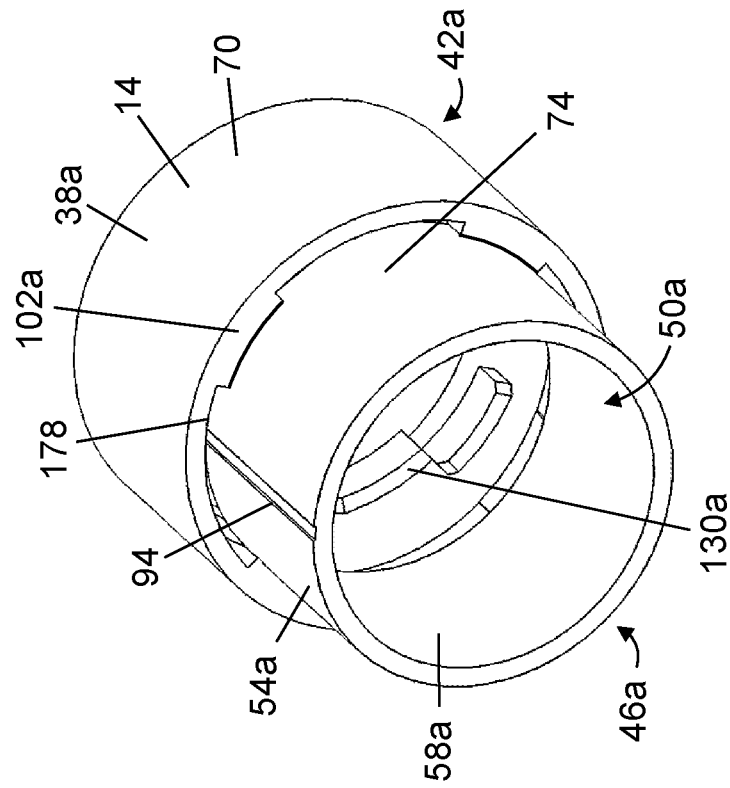
FIGS. 2A and 2B are perspective views of a female connector of the connector assembly of FIG. 1.
Figure 2A:
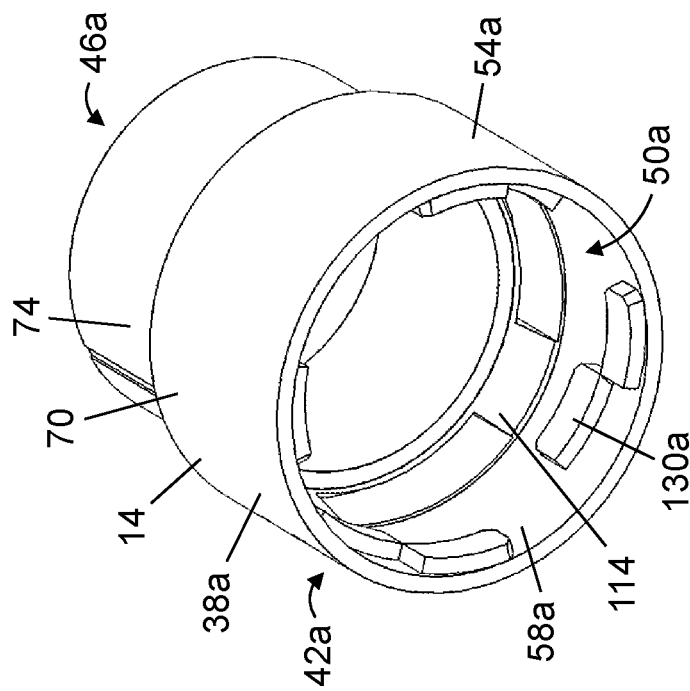
Figure 2G:
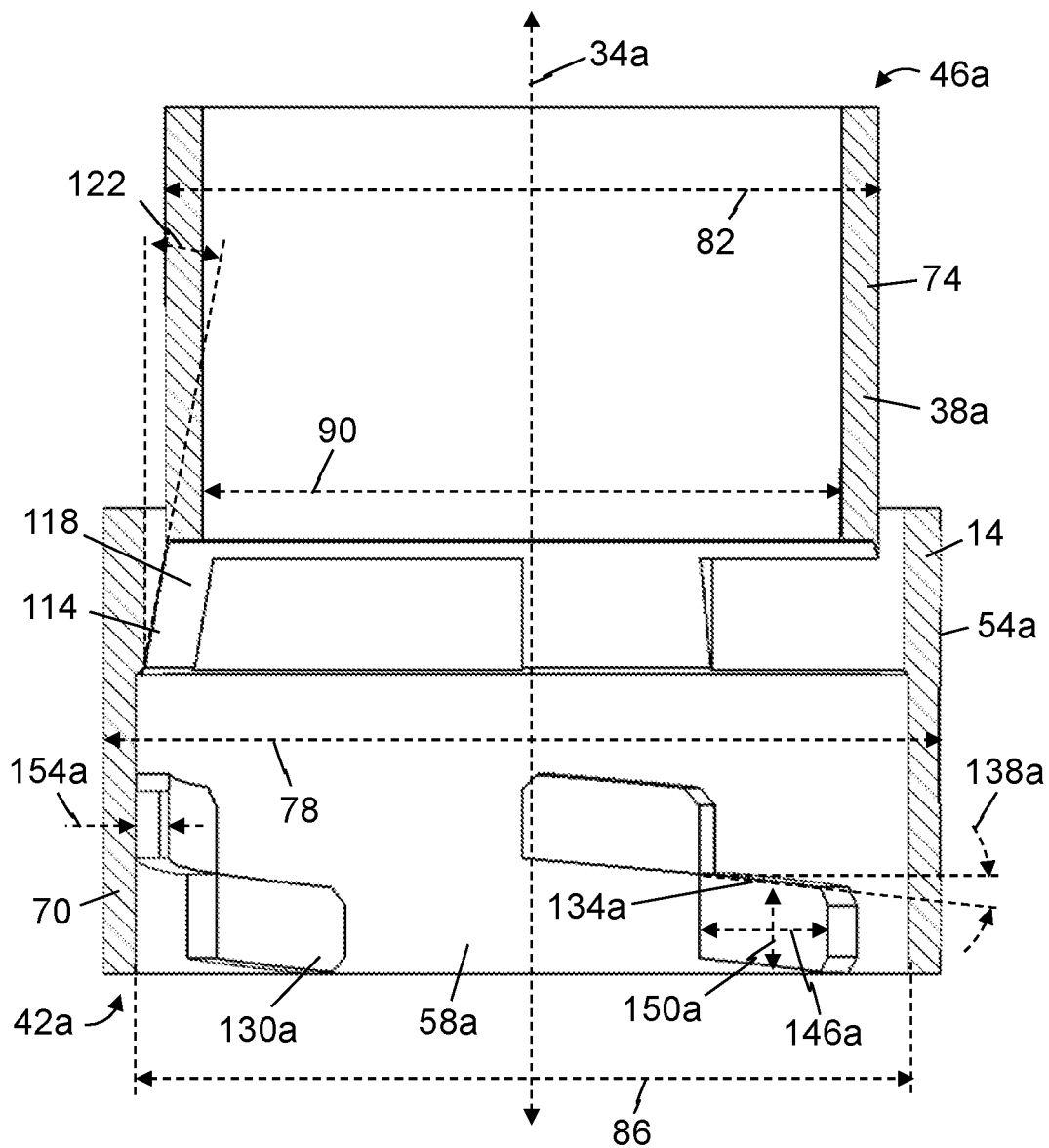
FIG. 2G is a cross-sectional side view of the female connector of FIGS. 2A and 2B, taken along line 2G-2G of FIG. 2D.

Referring to FIG. 1, shown is a first embodiment 10 of the present connector assemblies. As described below, connector assembly 10 can include a female connector 14 configured to be coupled to a first tubular (e.g., 22) and a male connector 18 configured to be coupled to a second tubular (e.g., 26), where the male connector can be coupled to the female connector to couple the second tubular to the first tubular. Such tubulars can include any suitable tubular, such as, for example, a tube, conduit, hose, riser, pipe (e.g., a drill, casing, pipeline, and/or the like pipe), a line (e.g., a choke, kill, and/or the like line), and/or the like, whether rigid and/or flexible. In some embodiments, a connector assembly (e.g., 10) can be configured to couple a tubular (e.g., 22, 26) to a structure; for example, one of a female connector (e.g., 14) and a male connector (e.g., 18) of the connector assembly can be coupled to the structure, and the other of the female connector and the male connector can be coupled to the tubular. Such a structure can include any suitable structure, such as, for example, a blowout preventer, blowout preventer stack, lower marine riser package, diverter, a component thereof, and/or the like. Female connector 14 and male connector 18 can comprise any suitable material, such as, for example, steel, aluminum, and/or the like.

Referring additionally to FIGS. 2A-2G, shown is female connector 14. Female connector 14 can include a sidewall 38a that extends between a first end 42a and a second end 46a to define an interior channel 50a. As described in more detail below, first end 42a of female connector 14 can be coupled to male connector 18. Second end 46a of female connector 14 can be coupled to a tubular (e.g., 22). For example, in this embodiment, second end 46a of female connector 14 can be received by the tubular. At second end 46a, an outer surface 54a of sidewall 38a can have a shape and dimensions that correspond to a shape and dimensions of an inner surface of the tubular. To illustrate, outer surface 54a of sidewall 38a at second end 46a and an inner surface of the tubular can each be cylindrical, with the outer surface of the sidewall having a diameter that is substantially equal to (e.g., but slightly smaller than) a diameter of the inner surface of the tubular. Sidewall 38a can taper in thickness at second end 46a to, for example, facilitate coupling of the tubular to the female connector. In some instances, the tubular can be secured to female connector 14 via, for example, one or more welds (e.g., along ledge 102a, described below), one or more fasteners (e.g., disposed through the tubular and into the female connector), one or more clamps (e.g., disposed around at least a portion of the tubular), and/or the like. In other embodiments, a female connector (e.g., 14) can have a second end (e.g., 46a) that is configured to be coupled to a tubular (e.g., 22) by receiving the tubular such that, for example, a portion of the tubular is at least partially surrounded by a sidewall (e.g., 38a) of the female connector, is disposed within an interior channel (e.g., 50a) of the female connector, and/or the like. In such embodiments, an inner surface (e.g., 58a) of the sidewall at the second end can have a shape and dimensions that correspond to a shape and dimensions of an outer surface of the tubular.

Sidewall 38a of female connector 14 can include a first portion 70 that is disposed closer to first end 42a than to second end 46a and a second portion 74 that is disposed closer to the second end than to the first end. First portion 70 can have a first maximum exterior transverse dimension 78, and second portion 74 can have a second maximum exterior transverse dimension 82 that is smaller than the first maximum exterior transverse dimension (FIG. 2G) (e.g., transverse dimension 82 can be 90% or less of transverse dimension 78). Similarly, first portion 70 can have a first maximum interior transverse dimension 86, and second portion 74 can have a second maximum interior transverse dimension 90 that is smaller than the first maximum interior transverse dimension (e.g., transverse dimension 90 can be 90% or less of transverse dimension 86).

Outer surface 54a of sidewall 38a (e.g., first portion 70 and/or second portion 74) can include cylindrical portion(s); for example, at least a portion of the sidewall can include an outer cross-sectional perimeter that is circular (FIGS. 2C and 2D). In some embodiments, a female connector (e.g., 14) can have a sidewall (e.g., 38a), at least a portion of which (e.g., a first portion 70 and/or a second portion 74) can include an outer cross-sectional perimeter that is elliptical, otherwise rounded, triangular, square, rectangular, and/or otherwise polygonal, whether having sharp or rounded vertices.

Female connector 14 can include a ledge 102a extending from outer surface 54a of sidewall 38a (e.g., between first portion 70 and second portion 74) that can extend at least partially around a circumference of the outer surface. Ledge 102a can facilitate coupling of a tubular (e.g., 22) to female connector 14 by, for example, abutting the tubular when second end 46a of sidewall 38a is received within the tubular. Female connector 14 can include one or more recesses 94 that are defined into and/or one or more protrusions that extend from outer surface 54*a* of sidewall 38*a* (e.g., keyway(s), key(s), spline(s), and/or the like), and the recess(es) and/or protrusion(s) can engage corresponding recess(es) and/or protrusion(s) defined into and/or extending from an inner surface of the tubular (e.g., to restrict rotation of the tubular relative to the female connector when the tubular is coupled to the female connector).

An inner surface 58*a* of sidewall 38*a* (e.g., first portion 70 and/or second portion 74) can include cylindrical portion(s); for example, at least a portion of the sidewall can include an inner cross-sectional perimeter that is circular (FIGS. 2C and 2D). In some embodiments, a female connector (e.g., 14) can have a sidewall (e.g., 38*a*), at least a portion of which (e.g., a first portion 70 and/or a second portion 74) can include an inner cross-sectional perimeter that is elliptical, otherwise rounded, triangular, square, rectangular, and/or otherwise polygonal, whether having sharp or round vertices.

Female connector 14 can include a ramp 114 extending from inner surface 58*a* of sidewall 38*a* (e.g., between first portion 70 and second portion 74) that can extend at least partially around a circumference of interior volume 50*a*. Ramp 114 can include a surface 118 that is inclined along a direction from first end 42*a* toward second end 46*a* and relative to a longitudinal axis 34*a* of female connector 14. For example, surface 118 can be conical. At least a portion of surface 118 can be angularly disposed relative to longitudinal axis 34*a* at an angle 122 that is greater than or substantially equal to any one of, or between any two of: 7.5, 10.0, 12.5, 15.0, 17.5, 20.0, 22.5, 25.0, 27.5, 30.0, 32.5, 35.0, 37.5, 40.0, 42.5, 45.0, 50.0, 55.0, 60.0, or more degrees (e.g., approximately 10 degrees). Ramp 114 (e.g., surface 118 thereof) can be configured to contact first end 42*b* of male connector 18 when the male connector is coupled to female connector 14 to, for example, facilitate a seal between the male connector and the female connector (e.g., surface 118 can be characterized as a tapered sealing surface).

Female connector 14 can include a plurality of lugs 130*a* (e.g., 2, 3, 4, 5, 6, 7, 8, 9, 10, or more lugs) extending from and disposed circumferentially along inner surface 58*a*. Lugs 130*a* of female connector 14 can be configured to engage a plurality of lugs 130*b* of male connector 18 (described below) when the male connector is coupled to the female connector. For example, each of lugs 130*a* of female connector 14 can include a mating surface 134*a* configured to contact at least one of lugs 130*b* of male connector 18 when the male connector is coupled to the female connector. Mating surface 134*a* of at least one of lugs 130*a* can be inclined relative to a plane that is perpendicular to longitudinal axis 34*a* such that, for example, when the mating surface is in contact with one of lugs 130*b* of male connector 18, rotation of the male connector relative to the female connector can urge the male connector further into interior channel 50*a* of female connector 14. For example, at least a portion of mating surface 134*a* of at least one of lugs 130*a* can be angularly disposed relative to a plane that is perpendicular to longitudinal axis 34*a* at an angle 138*a* that is less than or substantially equal to any one of, or between any two of: 2, 3, 4, 5, 6, 7, 8, 9, 10, 12, 14, 18, 20, 25, 30, 35, 40, 45, or more degrees (e.g., approximately 5 degrees).

Lugs 130*a* of female connector 14 can extend along inner surface 58*a* a collective circumferential distance 142*a* that is approximately equal to any one of, or between any two of: 50, 55, 60, 65, 70, 75, 80, or more % (e.g., approximately 75%) of a circumference of the inner surface (e.g., when viewed from first end 42*a*) (FIG. 2C). In at least this way, depending on the configuration of lugs 130*b* of male connector 18, lugs 130*a* of female connector 14 can support the male connector relative to the female connector along a majority of a circumference of the female connector, provide an increased surface area through which loads can be transferred between the male and female connectors, and/or the like. Circumferentially adjacent ones of lugs 130*a* can be circumferentially spaced from one another along inner surface 58*a* to, for example, allow one of lugs 130*b* of male connector 18 to pass between the adjacent ones of the lugs during coupling of the male connector to the female connector. For example, a circumferential distance 144*a* between circumferentially adjacent ones of lugs 130*a* can be greater than or substantially equal to a width 146*b* of one of lugs 130*b* of male connector 18 (FIG. 2C). Circumferentially adjacent ones of lugs 130*a* can be longitudinally offset (e.g., in a direction aligned with longitudinal axis 34*a*) from one another. Such longitudinally offset lugs 130*a* can, via interaction with lugs 130*b* of male connector 18, restrict rotation of the male connector relative to female connector 14.

At least one of lugs 130*a* can have a width 146*a* (e.g., measured along a circumference of inner surface 58*a*) and a length 150*a* (e.g., measured in a direction that is aligned with longitudinal axis 34*a*) that is smaller than the width. For example, for at least one of lugs 130*a*, length 150*a* can be less than or substantially equal to any one of, or between any two of: 15, 20, 25, 30, 35, 40, 45, 50, 55, 60, 65, 70, 75, 80, 85, or more % of width 146*a* (e.g., approximately 40% of the width). Lugs 130*a* can be configured to allow for a degree of misalignment between male connector 18 and female connector 14 when coupling the male connector to the female connector, whether such misalignment is longitudinal (e.g., in which longitudinal axis 34*a* of female connector 14 is angularly disposed and/or offset relative to longitudinal axis 34*b* of male connector 18), rotational (e.g., in which lugs 130*a* of the female connector would otherwise interfere with lugs 130*b* of the male connector to prevent or frustrate coupling of the male connector to the female connector), and/or the like. For example, length 150*a* of at least one of lugs 130*a* can decrease in a direction along a circumference of inner surface 58*a*, the lug can taper in length along the circumference of the inner surface, the lug can include chamfered, beveled, and/or the like edge(s), and/or the like. For further example, at least one of lugs 130*a* can include a thickness 154*a* that decreases along the lug in a direction along a circumference of inner surface 58*a* and/or in a direction aligned with longitudinal axis 34*a*.

Referring additionally to FIGS. 3A-3F, shown is male connector 18. Male connector 18 can include a sidewall 38*b* that extends between a first end 42*b* and a second end 46*b* to define an interior channel 50*b*. First end 42*b* of male connector 18 can be coupled to female connector 14. More particularly, first end 42*b* of male connector 18 can be received by female connector 14 such that, for example, the first end of the male connector is at least partially surrounded by sidewall 38*a* of the female connector, is disposed within interior channel 50*a* of the female connector, and/or the like. To illustrate, an outer surface 54*b* of male connector 18 at first end 42*b* and inner surface 58*a* of female connector 14 at first end 42*a* can each be cylindrical, with the outer surface of the male connector having a diameter that is substantially equal to (e.g., but slightly smaller than) a diameter of the inner surface of the female connector. Sidewall 38*b* of male connector 18 can taper in thickness at first end 42*b* to, for example, facilitate coupling of the male connector to female connector 14, define a (e.g., conical) sealing surface 158 configured to contact surface 118 of ramp 114, and/or the like. Similarly, sidewall 38a of female connector 14 can taper in thickness at first end 42a to, for example, facilitate coupling of male connector 18 to the female connector.

Second end 46b of male connector 18 can be coupled to a tubular (e.g., 26). For example, in this embodiment, second end 46b of male connector 18 can be received by the tubular. At second end 46b, outer surface 54b of sidewall 38b can have a shape and dimensions that correspond to a shape and dimensions of an inner surface of the tubular; to illustrate, the outer surface of the sidewall and the inner surface of the tubular can each be cylindrical, with the outer surface of the sidewall having a diameter that is substantially equal to (e.g., but slightly smaller than) a diameter of the inner surface of the tubular. Sidewall 38b can taper in thickness at second end 46b to, for example, facilitate coupling of the tubular to the male connector. In some instances, the tubular can be secured to male connector 18 via, for example, one or more welds (e.g., along ledge 102b, described below), one or more fasteners (e.g., disposed through the tubular and into the male connector), one or more clamps (e.g., disposed around at least a portion of the tubular), and/or the like. In other embodiments, a male connector (e.g., 18) can have a second end (e.g., 46b) that is configured to be coupled to a tubular (e.g., 26) by receiving the tubular such that, for example, a portion of the tubular is at least partially surrounded by a sidewall (e.g., 38b) of the male connector, is disposed within an interior channel (e.g., 50b) of the male connector, and/or the like. In such embodiments, an inner surface (e.g., 58b) of the sidewall at the second end can have a shape and dimensions that correspond to a shape and dimensions of an outer surface of the tubular.

Outer surface 54b of sidewall 38b can include cylindrical portion(s); for example, at least a portion of the sidewall can include an outer cross-sectional perimeter that is circular (FIGS. 3C and 3D). In some embodiments, a male connector (e.g., 18) can have a sidewall (e.g., 38b), at least a portion of which can include an outer cross-sectional perimeter that is elliptical, otherwise rounded, triangular, square, rectangular, and/or otherwise polygonal, whether having sharp or rounded vertices.

Male connector 18 can include a ledge 102b extending from outer surface 54b of sidewall 38b that can extend at least partially around a circumference of the outer surface. Ledge 102b can facilitate coupling of a tubular (e.g., 26) to male connector 18 by, for example, abutting the tubular when second end 46b of sidewall 38b is received within the tubular. Similarly to female connector 14, male connector 18 can include one or more recesses that are defined into and/or one or more protrusions that extend from outer surface 54b of sidewall 38b that can restrict rotation of the tubular relative to the male connector when the tubular is coupled to the male connector.

Inner surface 58b of sidewall 38b can include cylindrical portion(s); for example, at least a portion of the sidewall can include an inner cross-sectional perimeter that is circular (FIGS. 3C and 3D). In some embodiments, a male connector (e.g., 18) can have a sidewall (e.g., 38b), at least a portion of which can include an inner cross-sectional perimeter that is elliptical, otherwise rounded, triangular, square, rectangular, and/or otherwise polygonal, whether having sharp or round vertices.

Male connector 18 can include a plurality of lugs 130b (e.g., 2, 3, 4, 5, 6, 7, 8, 9, 10, or more lugs) extending from and disposed circumferentially along outer surface 54b. Lugs 130b of male connector 18 can be configured to engage lugs 130a of female connector 14 when the male connector is coupled to the female connector. For example, each of lugs 130b of male connector 18 can include a mating surface 134b configured to contact at least one of lugs 130a of female connector 14 when the male connector is coupled to the female connector (FIG. 3E). Mating surface 134b of at least one of lugs 130b can be inclined relative to a plane that is perpendicular to longitudinal axis 34b such that, for example, when the mating surface is in contact with one of lugs 130a of female connector 14, rotation of male connector 18 relative to the female connector can urge the male connector further into interior channel 50a of the female connector. For example, at least a portion of mating surface 134b of at least one of lugs 130b can be angularly disposed relative to a plane that is perpendicular to longitudinal axis 34b at an angle 138b that is less than or substantially equal to any one of, or between any two of: 2, 3, 4, 5, 6, 7, 8, 9, 10, 12, 14, 16, 18, 20, 25, 30, 35, 40, 45, or more degrees (e.g., approximately 5 degrees).

Lugs 130b of male connector 18 can extend along outer surface 54b a collective circumferential distance 142b that is approximately equal to any one of, or between any two of: 50, 55, 60, 65, 70, 75, 80, or more % (e.g., approximately 75%) of a circumference of the outer surface (e.g., when viewed from first end 42b) (FIG. 3C). In at least this way, depending on the configuration of lugs 130a of female connector 14, lugs 130b of male connector 18 can support the female connector relative to the male connector along a majority of a circumference of the male connector, provide an increased surface area through which loads can be transferred between the male and female connectors, and/or the like. Circumferentially adjacent ones of lugs 130b can be circumferentially spaced from one another along outer surface 54b to, for example, allow one of lugs 130a of female connector 14 to pass between the adjacent ones of the lugs during coupling of the male connector to the female connector. For example, a circumferential distance 144b between circumferentially adjacent ones of lugs 130b can be greater than or substantially equal to a width 146a of one of lugs 130a of female connector 14 (FIG. 3C). Circumferentially adjacent ones of lugs 130b can be longitudinally offset (e.g., in a direction aligned with longitudinal axis 34b) from one another. Such longitudinally offset lugs 130b can, via interaction with lugs 130a of female connector 14, restrict rotation of male connector 18 relative to female connector 14.

At least one of lugs 130b can have a width 146b (e.g., measured along a circumference of outer surface 54b) and a length 150b (e.g., measured in a direction that is aligned with longitudinal axis 34b) that is smaller than the width. For example, for at least one of lugs 130b, length 150b can be less than or substantially equal to any one of, or between any two of: 15, 20, 25, 30, 35, 40, 45, 50, 55, 60, 65, 70, 75, 80, 85, or more % of width 146b (e.g., approximately 40% of the width). Similarly to lugs 130a, lugs 130b can be configured to allow for a degree of misalignment between male connector 18 and female connector 14 when coupling the male connector to the female connector. For example, length 150b of at least one of lugs 130b can decrease in a direction along a circumference of outer surface 54b, the lug can taper in length along the circumference of the outer surface, the lug can include chamfered, beveled, and/or the like edge(s), and/or the like. For further example, at least one of lugs 130b can include a thickness 154b that decreases along the lug in a direction along a circumference of outer surface 54b and/or in a direction aligned with longitudinal axis 34b.

Figure 5A:
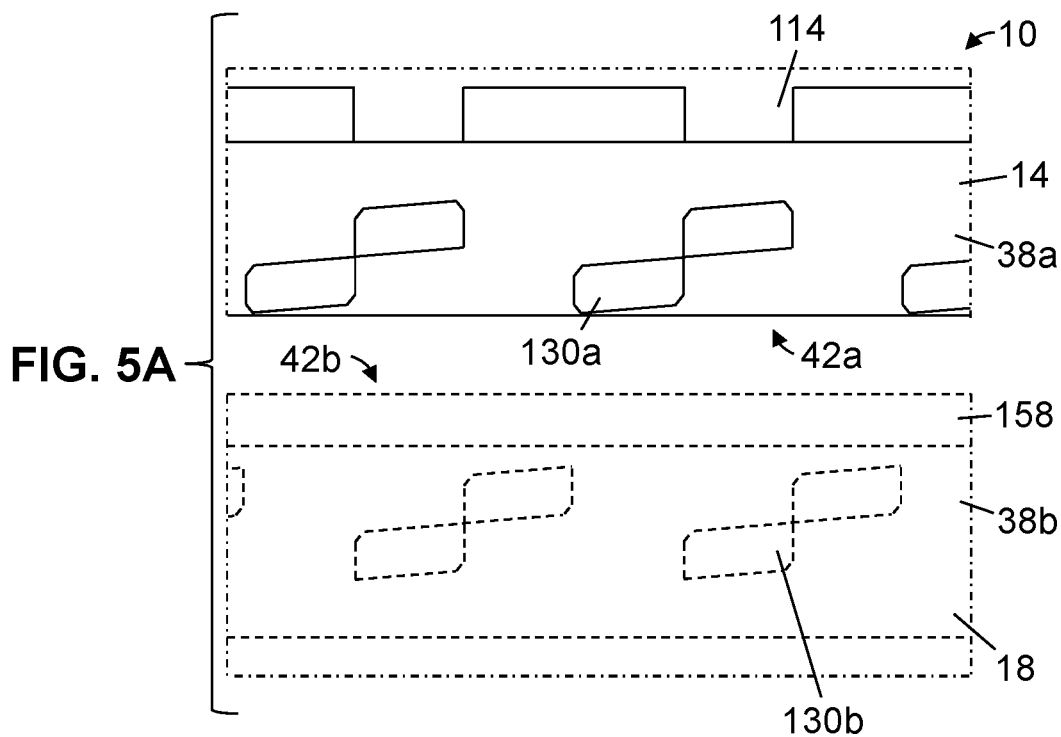
FIGS. 5A and 5B are schematic views of one embodiment of the present connector assemblies, illustrating a decoupled state and a coupled state, respectively, for a male connector and a female connector.
Figure 5B:
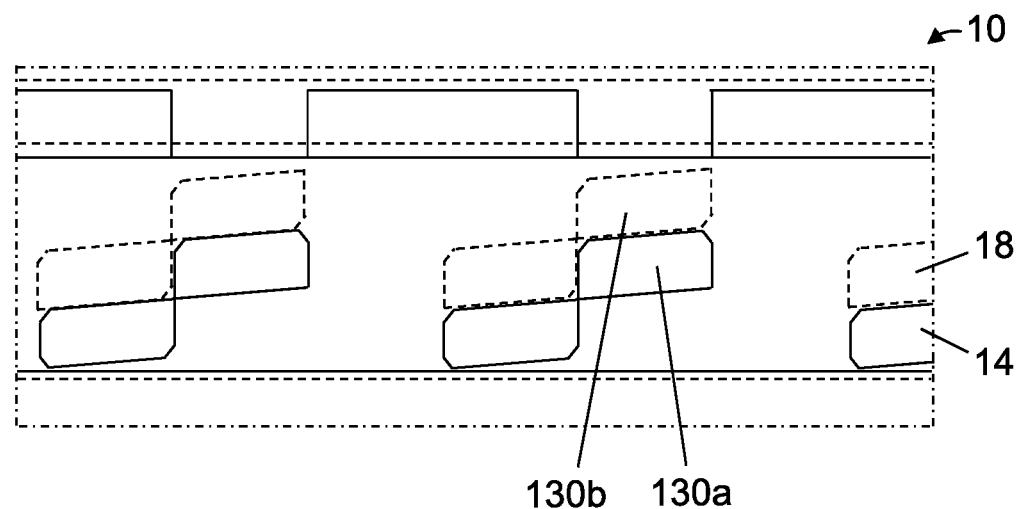

Referring additionally to FIGS. 5A and 5B, male connector 18 (represented in dashed lines and as if viewed from inside of the male connector) can be coupled to female connector 14 (represented in solid lines) such that sidewall 38b of the male connector is at least partially received within interior channel 50a of the female connector. When male connector 18 is coupled to female connector 14 (FIG. 5B), at least one of (e.g., each of) lugs 130b of the male connector can be: (1) disposed between at least one of lugs 130a of the female connector and second end 46a of the female connector (longitudinally between, meaning a distance measured along longitudinal axis 34a between: (1) a plane that is perpendicular to the longitudinal axis and intersects the at least one lug of the male connector; and (2) a plane that is perpendicular to the longitudinal axis and intersects the second end of the female connector is less than a distance measured along the longitudinal axis between: (1) a plane that is perpendicular to the longitudinal axis and intersects the at least one lug of the female connector; and (2) the plane that is perpendicular to the longitudinal axis and intersects the second end of the female connector); and (2) in contact with the at least one lug of the female connector. Similarly, when male connector 18 is coupled to female connector 14, at least one of (e.g., each of) lugs 130a of the female connector can be: (1) disposed between at least one of lugs 130b of the male connector and second end 46b of the male connector (longitudinally between, meaning a distance measured along longitudinal axis 34b between: (1) a plane that is perpendicular to the longitudinal axis and intersects the at least one lug of the female connector; and (2) a plane that is perpendicular to the longitudinal axis and intersects the second end of the male connector is less than a distance measured along the longitudinal axis between: (1) a plane that is perpendicular to the longitudinal axis and intersects the at least one lug of the male connector; and (2) the plane that is perpendicular to the longitudinal axis and intersects the second end of the male connector); and (2) in contact with the at least one lug of the male connector. Thus, lugs 130a and 130b can cooperate to physically resist separation of male connector 14 and female connector 18 when the male connector is coupled to the female connector.

FIGS. 6A-6E depict an exemplary method for coupling a male connector (e.g., 18, represented in dashed lines and as if viewed from inside of the male connector) to a female connector (e.g., 14, represented in solid lines). The female connector can include a sidewall (e.g., 38a) extending between a first end (e.g., 42a) and a second end (e.g., 46a) to define an interior channel (e.g., 50a), the sidewall having a cylindrical inner surface (e.g., 58a), and a plurality of first lugs (e.g., 130a1) extending from and disposed circumferentially along the inner surface. The male connector can include a sidewall (e.g., 38b) extending between a first end (e.g., 42b) and a second end (e.g., 46b) to define an interior channel (e.g., 50b), the sidewall having a cylindrical outer surface (e.g., 54a), and a plurality of first lugs (e.g., 130b1) extending from and disposed circumferentially along the outer surface.

Figure 6A:
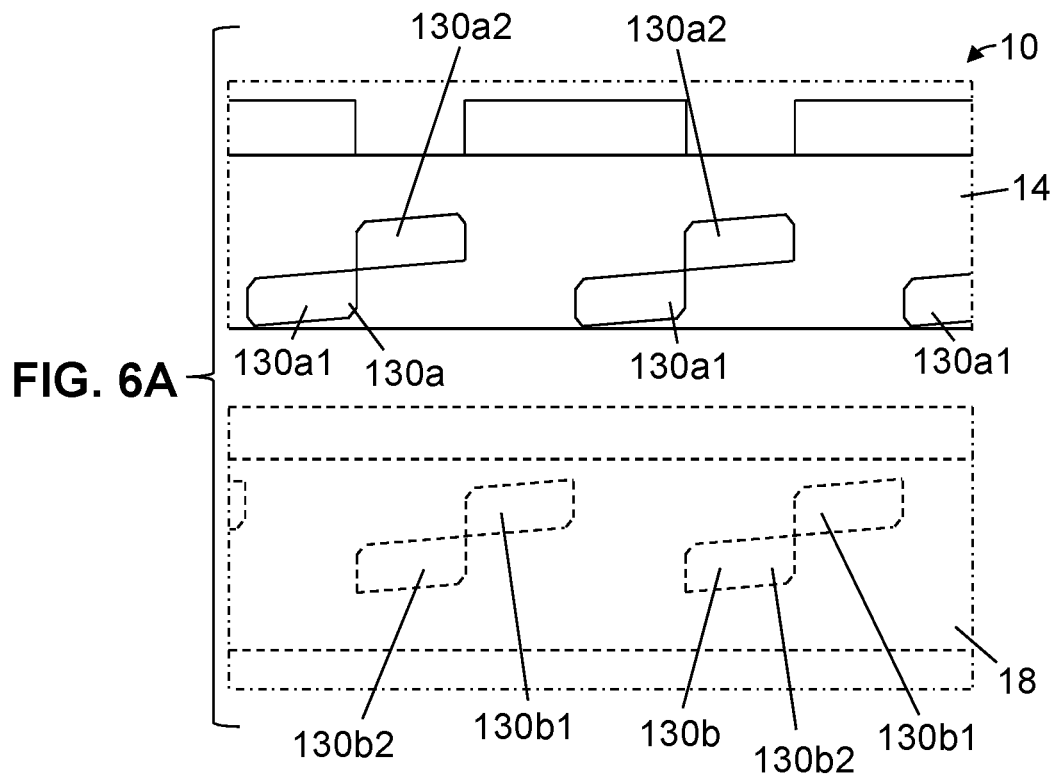
FIGS. 6A-6E are schematic views of one embodiment of the present connector assemblies, illustrating coupling of a male connector and a female connector.
Figure 6B:
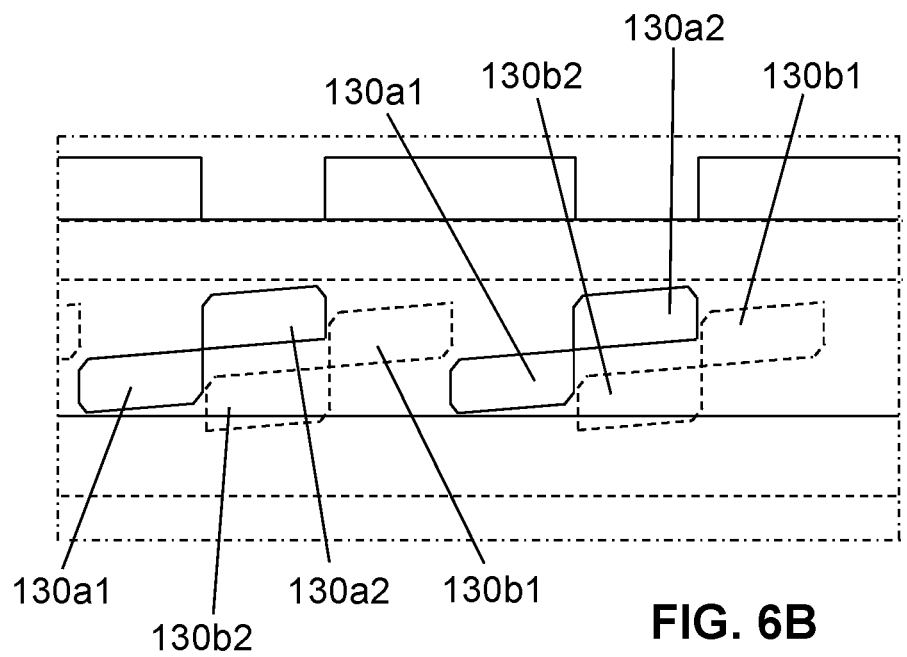
Figure 6C:
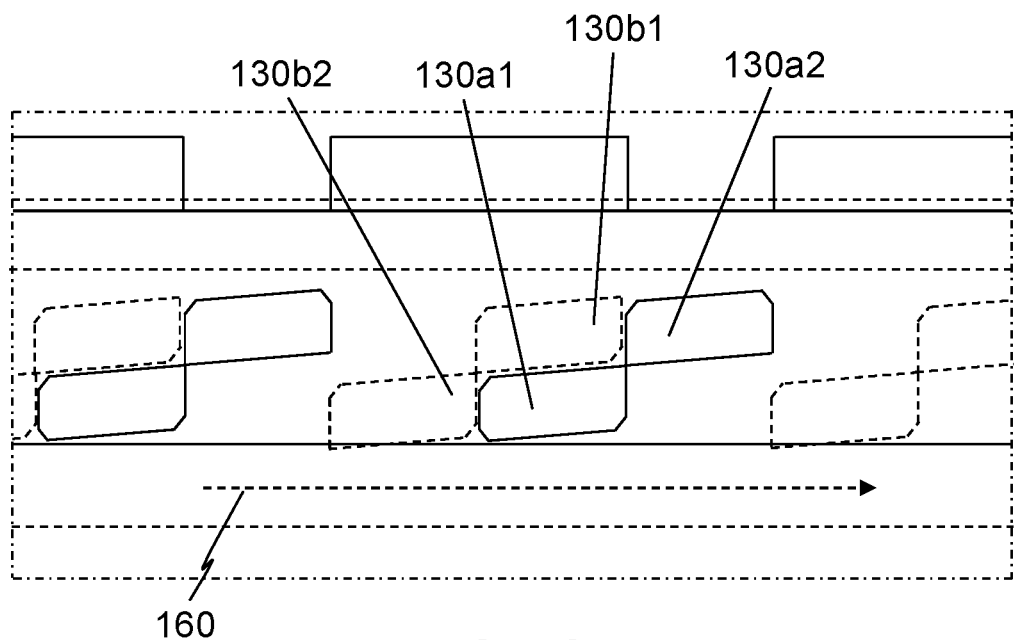

As shown in FIG. 6B, the first end of the male connector can be inserted through the first end of the female connector and at least partially into the interior channel of the female connector such that at least one of the first lugs of the male connector extends longitudinally beyond at least one of the first lugs of the female connector (e.g., such that a surface of the at least one first lug of the male connector that faces the second end of the male connector is disposed closer to the second end of the female connector than is a surface of the at least one first lug of the female connector that faces the second end of the female connector). As shown in FIG. 6C, once at least one of the first lugs of the male connector extends longitudinally beyond at least one of the first lugs of the female connector, the male connector can be rotated (e.g., generally in a direction indicated by arrow 160) relative to the female connector such that the at least one first lug of the male connector is: (1) disposed between the at least one first lug of the female connector and the second end of the female connector; and (2) in contact with the at least one first lug of the female connector.

Figure 6D:
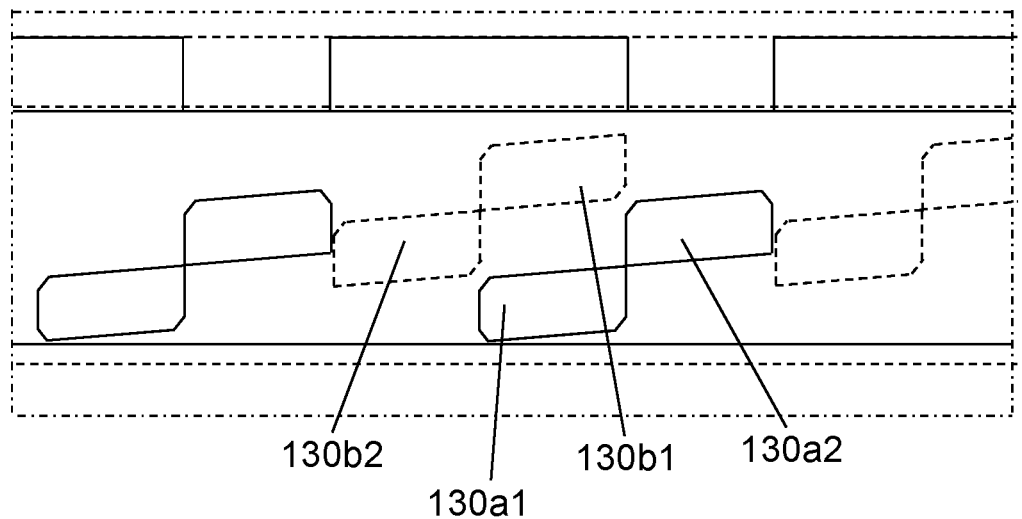
Figure 6E:
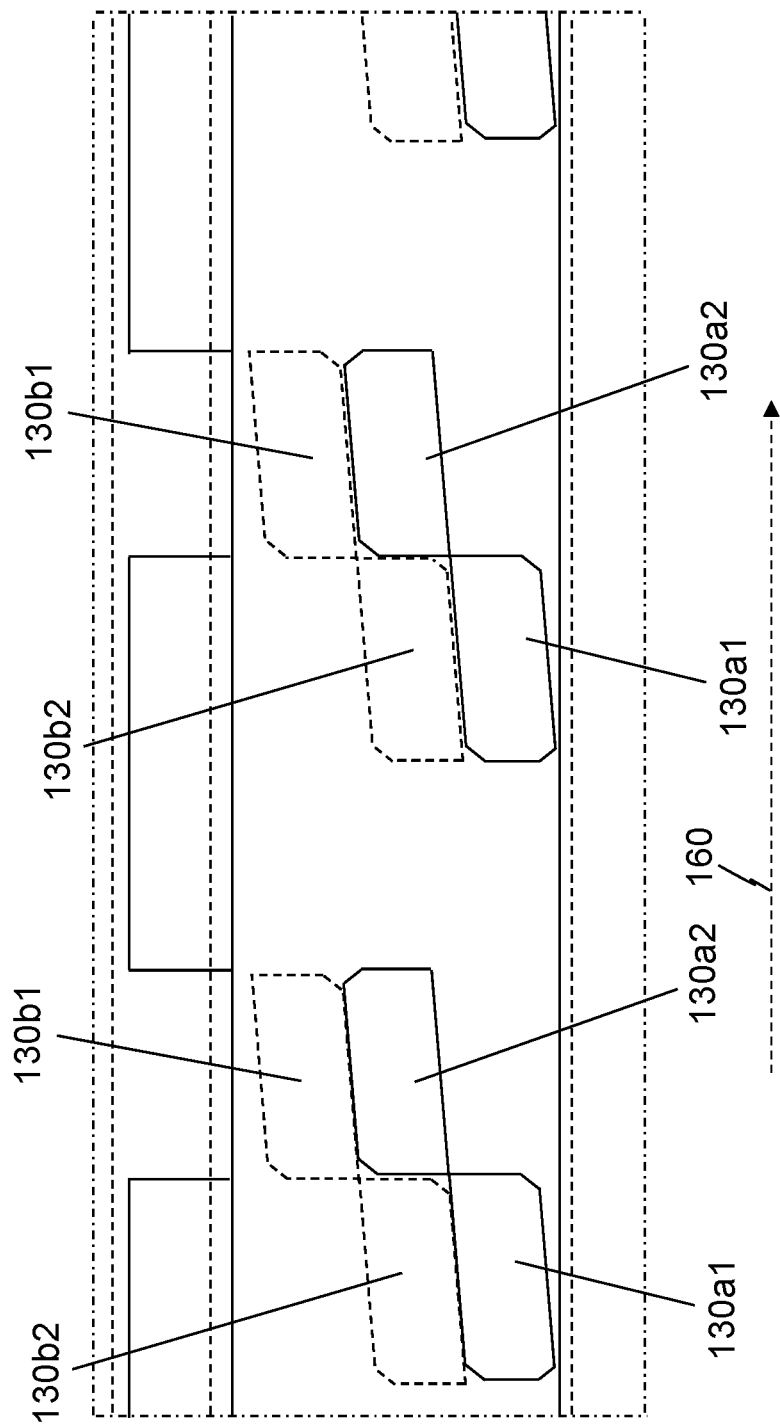

Turning to FIG. 6D, the male connector can comprise a plurality of second lugs (e.g., 130b2) extending from and disposed circumferentially along the outer surface, the second lugs being circumferentially and longitudinally offset relative to the first lugs of the male connector. The male connector can be further inserted into the female connector such that at least one of the second lugs of the male connector extends longitudinally beyond at least one of the first lugs of the female connector. As shown in FIG. 6E, once at least one of the second lugs of the male connector extends longitudinally beyond at least one of the first lugs of the female connector, the male connector can be further rotated (e.g., generally in a direction indicated by arrow 160) relative to the female connector such that the at least one second lug of the male connector is: (1) disposed between the at least one first lug of the female connector and the second end of the female connector; and (2) in contact with the at least one first lug of the female connector.

In some embodiments (e.g., 10), the female connector can include a plurality of second lugs (e.g., 130a2) extending from and disposed circumferentially along the inner surface, the second lugs being circumferentially and longitudinally offset relative to the first lugs of the female connector. As shown in FIGS. 6D and 6E, in such embodiments, the further inserting can be performed such that at least one of the first lugs of the male connector extends longitudinally beyond at least one of the second lugs of the female connector, and the further rotating can be performed such that the at least one first lug of the male connector is: (1) disposed between the at least one second lug of the female connector and the second end of the female connector; and (2) in contact with the at least one second lug of the female connector.

Figure 7B:
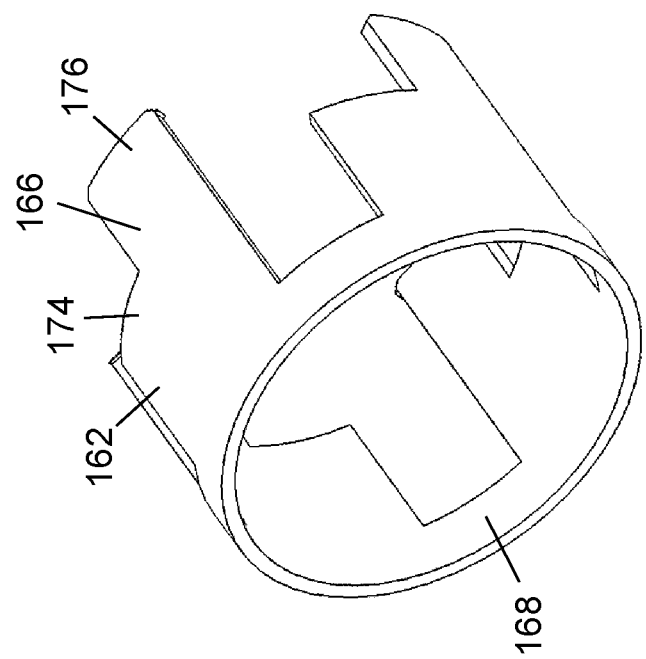
FIGS. 7A and 7B are perspective views of a locking member that may be suitable for use in some embodiments of the present connector assemblies.
Figure 7A:
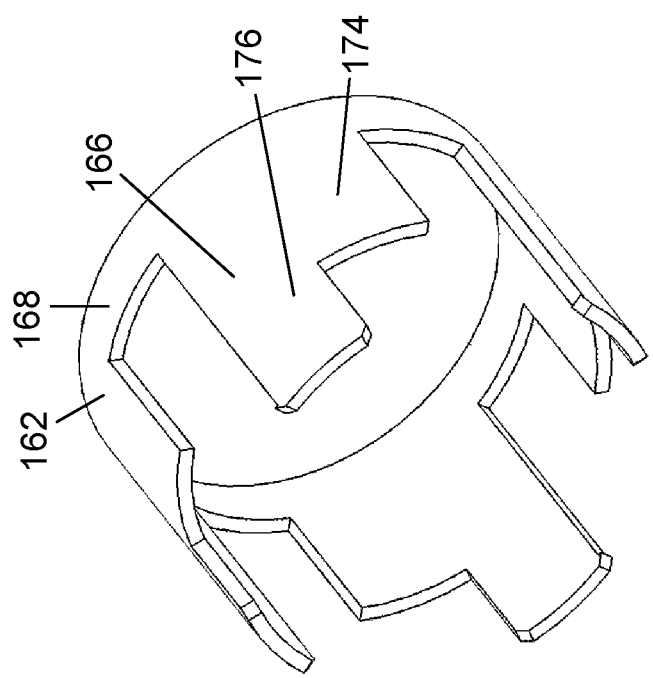
Figure 7C:
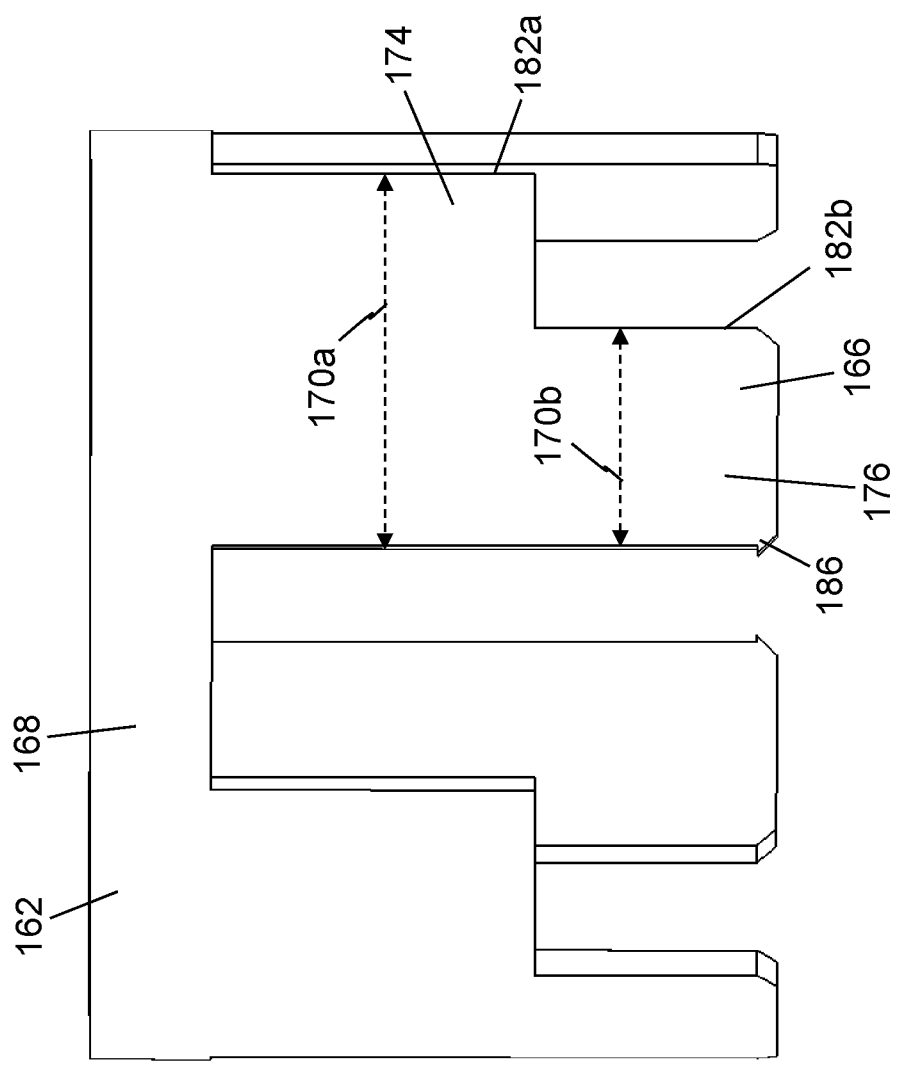
FIG. 7C is a side view of the locking member of FIGS. 7A and 7B.
Figure 8:
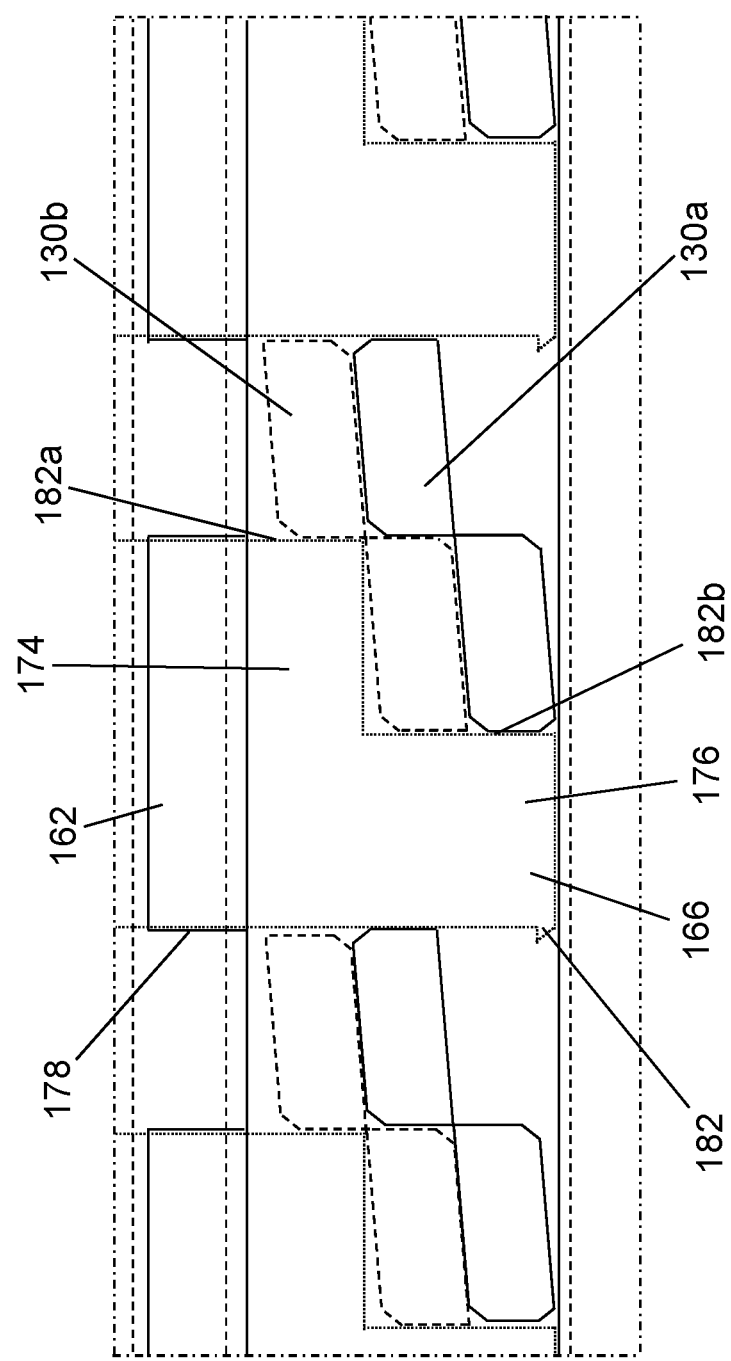
FIG. 8 is a schematic view of one embodiment of the present connector assemblies, illustrating use of a locking member to resist decoupling of a male connector and a female connector.

Referring now to FIGS. 7A-7C, connector assembly 10 can include a locking member 162 configured to be coupled to connector assembly 10 to resist separation of male connector 18 and female connector 14 when the male connector is coupled to the female connector. For example, locking member 162 can include one or more tabs 166, each configured to contact at least one of lugs 130a of female connector 14 and/or at least one of lugs 130b of male connector 18. Tab(s) 166, via contact with lug(s) 130a of female connector 14 and/or lug(s) 130b of male connector 18, can restrict movement of the lugs relative to one another and thus restrict rotation and/or translation of the female connector relative to the male connector. To illustrate, and referring additionally to FIG. 8, when male connector 18 is coupled to female connector 14 and locking member 162 is coupled to connector assembly 10, at least one of tab(s) 166 (represented in dotted lines) can be disposed between adjacent ones of lugs 130b of the male connector, between one of the lugs of the male connector and one of lugs 130a of the female connector, between adjacent ones of the lugs of the female connector, and/or the like.

In this embodiment, female connector 14 can define one or more openings 178 (e.g., through ledge 102a) configured to receive one or more tabs 166 of locking member 162 such that, for example, the tab(s) can extend through the opening(s) and into interior channel 50*a* to contact lug(s) 130*a* of female connector 14 and/or lug(s) 130*b* of male connector 18. In some embodiments, a male connector (e.g., 18) can define one or more openings (e.g., 178) configured to receive one or more tabs (e.g., 166) of a locking member (e.g., 162). Tab(s) 166 can extend from a body 168. Body 168 of locking member 162 can at least partially surround female connector 14 (and/or a tubular 22 coupled to the female connector) and/or male connector 18 (and/or a tubular 26 coupled to the male connector) when the locking member is coupled to connector assembly 10 (e.g., the body can be annular).

Tab(s) 166 can have a shape that corresponds to the relative placement of lugs 130*a* and/or 130*b* (e.g., the lugs on one of male connector 18 and female connector 14, lug(s) on the male connector and lug(s) on the female connector when the male connector is coupled to the female connector, and/or the like). For example, at least one of tab(s) 166 can have a width that varies along a length of the tab. A first portion 174 of at least one of tab(s) 166 can have a first width 170*a*, and a second portion 178 of the tab that is disposed between the first portion and a free end of the tab can have a second width 170*b* that is smaller than the first width (e.g., a portion of the tab can be L-shaped). Such a tab 166 can be configured to contact lugs (e.g., 130*a* and/or 130*b*) that are longitudinally and circumferentially offset relative to one another; for example, a longitudinal edge 182*a* of first portion 174 can contact a first lug (e.g., 130*a* or 130*b*), and a longitudinal edge 182*b* of second portion 178 can contact a second lug (e.g., 130*a* or 130*b*) that is circumferentially and longitudinally offset from the first lug. At least one of tab(s) 166 can include one or more one or more protrusions 186 (e.g., hook(s), barb(s), and/or the like) configured to resist decoupling of the tab from lug(s) (e.g., 130*a* and/or 130*b*) of male connector 14 and/or female connector 18.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A connector assembly for connecting a first tubular to a second tubular, the connector assembly comprising:
   a female connector having:
      a sidewall extending between a first end and a second end to define an interior channel, the sidewall having a cylindrical inner surface, the second end configured to be coupled to the first tubular; and
      a plurality of lugs extending from and disposed circumferentially along the inner surface; and
   a male connector having:
      a sidewall extending between a first end and a second end to define an interior channel, the sidewall having a cylindrical outer surface, the second end configured to be coupled to the second tubular; and
      a plurality of lugs extending from and disposed circumferentially along the outer surface,
   at least one of (1) two lugs from the plurality of lugs of the female connector being (a) spaced from one another over a circumferential distance that is substantially equal to or greater than a width of at least one of the two lugs of the female connector, and (b) longitudinally offset relative to one another, or (2) two lugs from the plurality of lugs of the male connector being a) spaced from one another over a circumferential distance that is substantially equal to or greater than a width of at least one of the two lugs of the male connector, and (b) longitudinally offset relative to one another, and at least one of (1) the two lugs from the plurality of lugs of the female connector, or (2) the two lugs from the plurality of lugs of the male connector are in contact with one another,
   the male connector being configured to be coupled to the female connector such that:
      (1) the sidewall of the male connector is at least partially received within the interior channel of the female connector, and
      (2) at least one of the lugs of the male connector is:
         (a) disposed between at least one of the lugs of the female connector and the second end of the female connector, and
         (b) in contact with the at least one lug of the female connector.

2. The connector assembly of claim 1, wherein the male connector is configured to be coupled to the female connector such that each of the lugs of the male connector is:
   disposed between at least one of the lugs of the female connector and the second end of the female connector; and
   in contact with the at least one lug of the female connector.

3. The connector assembly of claim 1, wherein the male connector is configured to be coupled to the female connector such that each of the lugs of the female connector is:
   disposed between at least one of the lugs of the male connector and the second end of the male connector; and
   in contact with the at least one lug of the male connector.

4. The connector assembly of claim 1, wherein, for at least one of the female connector and the male connector, a thickness of at least one of the lugs decreases along the lug in a direction from the second end and toward the first end.

5. The connector assembly claim 1, wherein:
   at least one of the lugs of the female connector includes a mating surface configured to contact at least one of the lugs of the male connector when the male connector is coupled to the female connector; and
   the mating surface is angularly disposed at a non-perpendicular angle relative to a plane that is perpendicular to a longitudinal axis of the female connector.

6. The connector assembly of claim 1, wherein:
at least one of the lugs of the male connector includes a mating surface configured to contact at least one of the lugs of the female connector when the male connector is coupled to the female connector; and
the mating surface is angularly disposed at a non-perpendicular angle relative to a plane that is perpendicular to a longitudinal axis of the male connector.

7. The connector assembly of claim 1, wherein at least one of the lugs of the female connector has a width, measured along a circumference of the inner surface, and a length, measured in a direction aligned with a longitudinal axis of the female connector, that is smaller than the width.

8. The connector assembly of claim 1, wherein at least one of the lugs of the male connector has a width, measured along a circumference of the outer surface, and a length, measured in a direction aligned with a longitudinal axis of the male connector, that is smaller than the width.

9. The connector assembly of claim 1, wherein, for the female connector, the lugs extend along the inner surface of the sidewall a collective circumferential distance that is approximately 75% of a circumference of the inner surface.

10. The connector assembly of claim 1, wherein, for the male connector, the lugs extend along the outer surface of the sidewall a collective circumferential distance that is approximately 75% of a circumference of the outer surface.

11. The connector assembly of claim 1, wherein the female connector includes a bevel extending from the inner surface of the sidewall, the bevel being inclined along a direction from the first end of the female connector toward the second end of the female connector and relative to a longitudinal axis of the female connector, the bevel configured to contact the outer surface of the first end of the male connector when the male connector is coupled to the female connector.

12. The connector assembly of claim 1, wherein at least one of the sidewall of the female connector tapers in thickness at the first end of the female connector, or the sidewall of the male connector tapers in thickness at the first end of the male connector.

13. The connector assembly of claim 1, further comprising:
a locking member having one or more tabs;
each tab of the one or more tabs including a first portion having a first
width, and a second portion disposed between the first portion and a
free end of the tab, the second portion having a second width that is smaller than the first width;
the locking member being configured to be coupled to the female connector or the male connector such that, when the male connector is coupled to the female connector, each of the one or more tabs contacts at least one of the lugs of the female connector or at least one of the lugs of the male connector.

14. The connector assembly of claim 1, wherein:
the female connector is coupled to the first tubular; or
the male connector is coupled to the second tubular.

15. The connector assembly of claim 14, wherein the first tubular is a riser, a drill pipe, a casing, a choke line, a kill line, or a hose, and the second tubular is a riser, a drill pipe a casing, a choke line, a kill line, or a hose.

16. The connector assembly of claim 1, wherein the male connector is configured to be coupled to the female connector at least by:
inserting the first end of the male connector through the first end of the female connector and into the interior channel of the female connector such that at least one of the lugs of the male connector extends longitudinally beyond at least one of the lugs of the female connector; and
rotating the male connector relative to the female connector such that the at least one lug of the male connector is:
disposed between the at least one lug of the female connector and the second end of the female connector; and
in contact with the at least one lug of the female connector.

17. A method for connecting a first tubular to a second tubular, the method comprising:
coupling a male connector to a female connector,
the female connector including:
a sidewall extending between a first end and a second end to define an interior channel, the sidewall of the female connector having a cylindrical inner surface, the second end of the female connector being coupled to a first tubular; and
a plurality of lugs extending from and disposed circumferentially along the inner surface of female connector,
the male connector including:
a sidewall extending between a first end and a second end to define an interior channel, the sidewall having a cylindrical outer surface, the second end coupled to a second tubular; and
a first plurality of lugs extending from and disposed circumferentially along the outer surface;
a second plurality of lugs extending from and disposed along the outer surface and being circumferentially and longitudinally offset relative to the first plurality of lugs of the male connector;
a first edge of a first lug from the first plurality of lugs being in contact, with a second edge of a second lug from the second plurality of lugs, and
the coupling the male connector to the female connector including:
inserting the first end of the male connector through the first end of the female connector and at least partially into the interior channel of the female connector such that at least the first lug of the first plurality of lugs of the male connector extends longitudinally beyond at least one lug of the plurality of lugs of the female connector; and
rotating the male connector relative to the female connector such that at least the first lug of the first plurality of lugs of the male connector is:
disposed between the at least one lug of the plurality of lugs of the female connector and the second end of the female connector; and
in contact with the at least one lug of the plurality of lugs of the female connector.

18. The method of claim 17, wherein:
the coupling the male connector to the female connector comprises:
further inserting the male connector into the female connector such that at least one of the second lugs of the male connector extends longitudinally beyond at least one of the first lugs of the female connector; and
further rotating the male connector relative to the female connector such that the at least one second lug of the male connector is:

disposed between the at least one first lug of the female connector and the second end of the female connector; and in contact with the at least one first lug of the female connector.

19. The method of claim 18, wherein:

the female connector comprises a plurality of second lugs extending from and disposed circumferentially along the inner surface, the second lugs being circumferentially and longitudinally offset relative to the first lugs of the female connector;

the further inserting is performed such that at least one of the first lugs of the male connector extends longitudinally beyond at least one of the second lugs of the female connector; and the further rotating is performed such that the at least one first lug of the male connector is:

disposed between the at least one second lug of the female connector and the second end of the female connector; and in contact with the at least one second lug of the female connector.

20. A connector assembly for connecting a first tubular to a second tubular, the connector assembly comprising:

a female connector having:
a sidewall extending between a first end and a second end to define an interior channel, the sidewall having a cylindrical inner surface, the second end of the sidewall of the female connector configured to be coupled to the first tubular; and
a plurality of lugs extending from and disposed circumferentially along the inner surface; and a male connector having:
a sidewall extending between a first end and a second end to define an interior channel, the sidewall having a cylindrical outer surface, the second end of the sidewall of the male connector configured to be coupled to the second tubular; and
a plurality of lugs extending from and disposed circumferentially along the outer surface, at least one of (1) a radial thickness of at least one lug of the plurality of lugs of the female connector decreases along the at least one lug in a circumferential direction along a circumference of the inner surface of the female connector, or (2) a radial thickness of at least one lug of the plurality of lugs of the male connector decreases along the at least one lug in a circumferential direction along a circumference of the outer surface of the male connector, the male connector being configured to be coupled to the female connector such that:

(1) the sidewall of the male connector is at least partially received within the interior channel of the female connector, and (2) at least one of the lugs of the male connector is:
(a) disposed between at least one of the lugs of the female connector and the second end of the female connector, and
(b) in contact with the at least one lug of the female connector.

21. The connector assembly of claim 20, wherein at least one of (1) two lugs from the plurality of lugs of the female connector are circumferentially adjacent and longitudinally offset relative to one another, or (2) two lugs from the plurality of lugs of the male connector are circumferentially adjacent and longitudinally offset relative to one another.

22. The connector assembly of claim 21, wherein at least one of (1) the two lugs from the plurality of lugs of the female connector that are circumferentially adjacent and longitudinally offset relative to one another, or (2) the two lugs from the plurality of lugs of the male connector that are circumferentially adjacent and longitudinally offset relative to one another, are in contact with one another.

23. The connector assembly of claim 20, wherein the male connector is configured to be coupled to the female connector such that each of the lugs of the male connector is:

disposed between at least one of the lugs of the female connector and the second end of the female connector; and in contact with the at least one lug of the female connector.

24. The connector assembly of claim 20, wherein the male connector is configured to be coupled to the female connector such that each of the lugs of the female connector is:

disposed between at least one of the lugs of the male connector and the second end of the male connector; and in contact with the at least one lug of the male connector.

25. A connector assembly for connecting a first tubular to a second tubular, the connector assembly comprising:

(i) a female connector having:
a sidewall extending between a first end and a second end to define an interior channel, the sidewall having a cylindrical inner surface, the second end configured to be coupled to the first tubular; and
a plurality of lugs extending from and disposed circumferentially along the inner surface;

(ii) a male connector having:
a sidewall extending between a first end and a second end to define an interior channel, the sidewall having a cylindrical outer surface, the second end configured to be coupled to the second tubular; and
a plurality of lugs extending from and disposed circumferentially along the outer surface; and (iii) a locking member having one or more tabs, each tab of the one or more tabs including a first portion having a first width, and a second portion disposed between the first portion and a free end of the tab, the second portion having a second width that is smaller than the first width;

at least one of (a) two lugs from the plurality of lugs of the female connector being circumferentially adjacent and longitudinally offset relative to one another, or (b) two lugs from the plurality of lugs of the male connector being circumferentially adjacent and longitudinally offset relative to one another, the male connector being configured to be coupled to the female connector such that:

(1) the sidewall of the male connector is at least partially received within the interior channel of the female connector, and (2) at least one of the lugs of the male connector is:
(a) disposed between at least one of the lugs of the female connector and the second end of the female connector, and
(b) in contact with the at least one lug of the female connector; and the locking member being configured to be coupled to the female connector or the male connector such that, when the male connector is coupled to the female connector, each of the one or more tabs contacts at least one of the lugs of the female connector or at least one of the lugs of the male connector.

26. The connector assembly of claim 25, wherein
the locking member is further configured to be coupled to the female connector or the male connector such that, when the male connector is coupled to the female connector, each of (i) a first portion of at least one tab of the one or more tabs contacts the at least one of the lugs of the male connector disposed between the at least one of the lugs of the female connector and the second end of the female connector, and (ii) a second portion of the at least one tab of the one or more tabs contacts the at least one of the lugs of the female connector.

27. The connector assembly of claim 25, wherein the male connector is configured to be coupled to the female connector such that each of the lugs of the male connector is:
disposed between at least one of the lugs of the female connector and the second end of the female connector; and
in contact with the at least one lug of the female connector.

28. The connector assembly of claim 25, wherein the male connector is configured to be coupled to the female connector such that each of the lugs of the female connector is:
disposed between at least one of the lugs of the male connector and the second end of the male connector; and
in contact with the at least one lug of the male connector.

29. The connector assembly of claim 25, wherein at least one of (1) the two lugs from the plurality of lugs of the female connector that are circumferentially adjacent and longitudinally offset relative to one another, or (2) the two lugs from the plurality of lugs of the male connector that are circumferentially adjacent and longitudinally offset relative to one another, are in contact with one another.

30. The connector assembly of claim 25, wherein a radial thickness of at least one of the lugs of the male connector or the female connector decreases along the lug in a longitudinal direction from the second end and toward the first end.

31. The connector assembly claim 25, wherein:
at least one of (1) one of the lugs of the female connector includes a mating surface configured to contact at least one of the lugs of the male connector when the male connector is coupled to the female connector; and the mating surface is angularly disposed at a non-perpendicular angle relative to a plane that is perpendicular to a longitudinal axis of the female connector, or (2) one of the lugs of the male connector includes a mating surface configured to contact at least one of the lugs of the female connector when the male connector is coupled to the female connector, and the mating surface is angularly disposed at a non-perpendicular angle relative to a plane that is perpendicular to a longitudinal axis of the male connector.

32. A connector assembly for connecting a first tubular to a second tubular, the connector assembly comprising:
a female connector having:
a sidewall extending between a first end and a second end to define an interior channel, the sidewall having a cylindrical inner surface, the second end of the sidewall of the female connector configured to be coupled to the first tubular; and
a plurality of lugs extending from and disposed circumferentially along the inner surface; and
a male connector having:
a sidewall extending between a first end and a second end to define an interior channel, the sidewall having a cylindrical outer surface, the second end of the sidewall of the male connector configured to be coupled to the second tubular; and
a plurality of lugs extending from and disposed circumferentially along the outer surface, at least one of (1) two lugs from the plurality of lugs of the female connector being spaced from one another over a distance along a circumference of the inner surface of the female connector and longitudinally offset relative to one another, or (2) two lugs from the plurality of lugs of the male connector being spaced from one another over a distance along a circumference of the outer surface of the male connector and longitudinally offset relative to one another, and at least one of (1) the two lugs from the plurality of lugs of the female connector, or (2) the two lugs from the plurality of lugs of the male connector are in contact with one another, the male connector being configured to be coupled to the female connector such that:
(1) the sidewall of the male connector is at least partially received within the interior channel of the female connector,
(2) at least one of the lugs of the male connector is disposed between at least one of the lugs of the female connector and the second end of the female connector, and
(3) at least one of (i) at least one of the lugs of the male connector is disposed to be in contact with two lugs of the female connector via two non-parallel surfaces, or (ii) at least one of the lugs of the female connector is disposed to be in contact with two lugs of the male connector via two non-parallel surfaces.

33. The connector assembly of claim 32, wherein at least one of (1) at least one of the lugs of the male connector has a first width, measured along a circumference of the outer surface, and a first length, measured in a direction aligned with a longitudinal axis of the male connector, that is smaller than the first width, or (2) at least one of the lugs of the female connector has a second width, measured along a circumference of the inner surface, and a second length, measured in a direction aligned with a longitudinal axis of the female connector, that is smaller than the second width.

34. The connector assembly of claim 32, wherein the female connector includes a bevel extending from the inner surface of the sidewall, the bevel being inclined along a direction from the first end of the female connector toward the second end of the female connector and relative to a longitudinal axis of the female connector, the bevel configured to contact the outer surface of the first end of the male connector when the male connector is coupled to the female connector.

35. The connector assembly of claim 32, wherein at least one of the sidewall of the female connector tapers in thickness at the first end of the female connector, or the sidewall of the male connector tapers in thickness at the first end of the male connector.

36. The connector assembly of claim 32, further comprising:
a locking member having one or more tabs;
each tab of the one or more tabs including a first portion having a first width, and a second portion disposed between the first portion and a free end of the tab, the second portion having a second width that is smaller than the first width;
the locking member being configured to be coupled to the female connector or the male connector such that, when the male connector is coupled to the female connector, each of the one or more tabs contacts at least one of the lugs of the female connector or at least one of the lugs of the male connector.

37. The connector assembly claim 32, wherein at least one of the lugs of the female connector includes a mating surface configured to contact at least one of the lugs of the male connector when the male connector is coupled to the female connector, and the mating surface is disposed along a non-zero angle relative to a plane that is perpendicular to a longitudinal axis of the female connector.

38. The connector assembly claim 32, wherein at least one of the lugs of the male connector includes a mating surface configured to contact at least one of the lugs of the female connector when the male connector is coupled to the female connector, and the mating surface is disposed along a non-zero angle relative to a plane that is perpendicular to a longitudinal axis of the male connector.

39. The connector assembly of claim 32, wherein at least one of (1) two lugs from the plurality of lugs of the female connector being spaced from one another over a distance along a circumference of the inner surface of the female connector and longitudinally offset relative to one another, or (2) two lugs from the plurality of lugs of the male connector being spaced from one another over a distance along a circumference of the outer surface of the male connector and longitudinally offset relative to one another, are in contact with one another.

* * * * *